United States Patent
Georgiou et al.

(10) Patent No.: US 12,422,676 B2
(45) Date of Patent: Sep. 23, 2025

(54) EYE TRACKING HEAD MOUNTED DISPLAY DEVICE

(71) Applicant: Microsoft Technology Licensing, LLC, Redmond, WA (US)

(72) Inventors: Andreas Georgiou, Cambridge (GB); Maria Pace, Palo Alto, CA (US); Bernard Kress, Redwood City, CA (US); Ishan Chatterjee, Seattle, WA (US); Joel Kollin, Seattle, WA (US); Mario Possiwan, Paris (FR)

(73) Assignee: Microsoft Technology Licensing, LLC, Redmond, WA (US)

( * ) Notice: Subject to any disclaimer, the term of this patent is extended or adjusted under 35 U.S.C. 154(b) by 635 days.

(21) Appl. No.: 17/490,228

(22) Filed: Sep. 30, 2021

(65) Prior Publication Data

US 2023/0100656 A1    Mar. 30, 2023

(51) Int. Cl.
  *G02B 27/01*    (2006.01)
  *G06F 3/01*    (2006.01)
  *H04N 13/254*    (2018.01)

(52) U.S. Cl.
  CPC ......... *G02B 27/0172* (2013.01); *G06F 3/013* (2013.01); *H04N 13/254* (2018.05); *G02B 2027/0138* (2013.01); *G02B 2027/014* (2013.01); *G02B 2027/0187* (2013.01)

(58) Field of Classification Search
  CPC .. G02B 26/085; G02B 26/101; G02B 26/105; G02B 25/00; G02B 25/001
  USPC ....................................................... 359/643
  See application file for complete search history.

(56) References Cited

U.S. PATENT DOCUMENTS

| | | | |
|---|---|---|---|
| 9,977,248 B1 | 5/2018 | Xie | |
| 10,319,266 B1* | 6/2019 | Percival | G02B 27/0172 |
| 10,606,349 B1 | 3/2020 | Ouderkirk et al. | |
| 11,885,965 B1* | 1/2024 | Maric | G02B 27/0101 |
| 11,892,644 B2* | 2/2024 | Osterhout | G06F 3/03542 |
| 12,085,734 B1* | 9/2024 | Maric | G02B 25/001 |
| 2018/0203231 A1* | 7/2018 | Glik | G02B 27/0081 |
| 2020/0150408 A1 | 5/2020 | Fard et al. | |
| 2020/0355929 A1 | 11/2020 | Zhang et al. | |
| 2021/0072429 A1 | 3/2021 | Meng et al. | |
| 2021/0302738 A1* | 9/2021 | Calafiore | G02B 6/3596 |

FOREIGN PATENT DOCUMENTS

| | | |
|---|---|---|
| CN | 112014975 A | 12/2020 |
| WO | 2018132302 A1 | 7/2018 |

OTHER PUBLICATIONS

"International Search Report and Written Opinion Issued in PCT Application No. PCT/US22/042405", Mailed Date: Dec. 9, 2022, 11 Pages.

* cited by examiner

*Primary Examiner* — Henry Duong
(74) *Attorney, Agent, or Firm* — Rainier Patents, P.S.

(57) ABSTRACT

This document relates to head mounted display devices. One example can include a housing configured to be positioned relative to a head and eye of a user and a transparent visual assembly positioned by the housing in front of the user's eye and comprising multiple eye tracking illuminators distributed across the transparent visual assembly and configured to emit non-visible light and multiple eye tracking detectors distributed across the transparent visual assembly and configured to detect the non-visible light reflected back from the eye of the user.

20 Claims, 16 Drawing Sheets

EYE TRACKING HEAD MOUNTED DISPLAY DEVICE

BACKGROUND

Head mounted display devices can enable users to experience immersive virtual reality scenarios and/or augmented reality scenarios. Such technology may be incorporated into a device in the form of eyeglasses, goggles, a helmet, a visor, or some other type of head-mounted display (HMD) device or eyewear. In order for the HMD device to be comfortable for any length of time, the head mounted display should be positioned relatively closely to the user's face (e.g., eyes) and should be relatively light weight. Despite these constraints, the HMD device should be able to perform multiple functionalities, such as image generation, eye tracking, and/or 3D sensing of the environment. The present concepts can address these and/or other issues.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items. In some figures where multiple instances of an element are illustrated, not all instances are designated to avoid clutter on the drawing page.

DETAILED DESCRIPTION

Overview

Head-mounted display (HMD) devices can present virtual content to a user in a virtual reality scenario and/or an augmented reality scenario. A primary function of the HMD device is to display images at an 'eye box' for perception by the user. While the display function is a central function of the HMD device, other functions, such as sensing the environment via depth sensing (e.g., 3D sensing) and eye tracking to understand the user's interaction within the environment can be valuable functions that contribute to the overall quality of the user experience. Traditionally, 3D sensing and eye tracking have been accomplished with dedicated components positioned outside of the user's field of view (FoV).

The present concepts can accomplish the eye tracking and/or 3D sensing within the FoV of the HMD device. The concepts can include multiple ways that 3D sensing, eye tracking, and/or image generation can be enhanced, simplified, and/or reduced in cost by employing a distributed and dispersed arrangement of electronic components and/or optical components on a visual assembly. The electronic components can be small enough that they are imperceptible to the user. The visual assembly can be transparent to visible light despite the distributed and dispersed arrangement of electronic components and/or optical components on the visual assembly. Utilizing multiple electronic components dispersed and distributed across the FoV can offer several advantages over traditional designs. These and other aspects are discussed below.

Figure 1A:
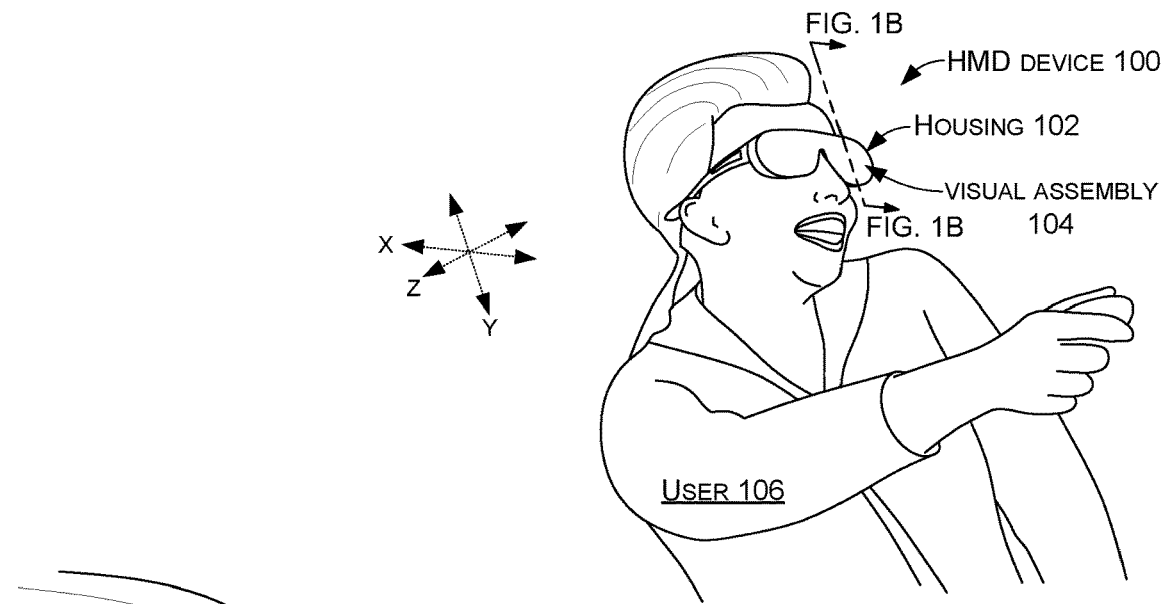
FIG. 1A illustrates a perspective view of an example HMD device that is consistent with some implementations of the present concepts.
Figure 1B:
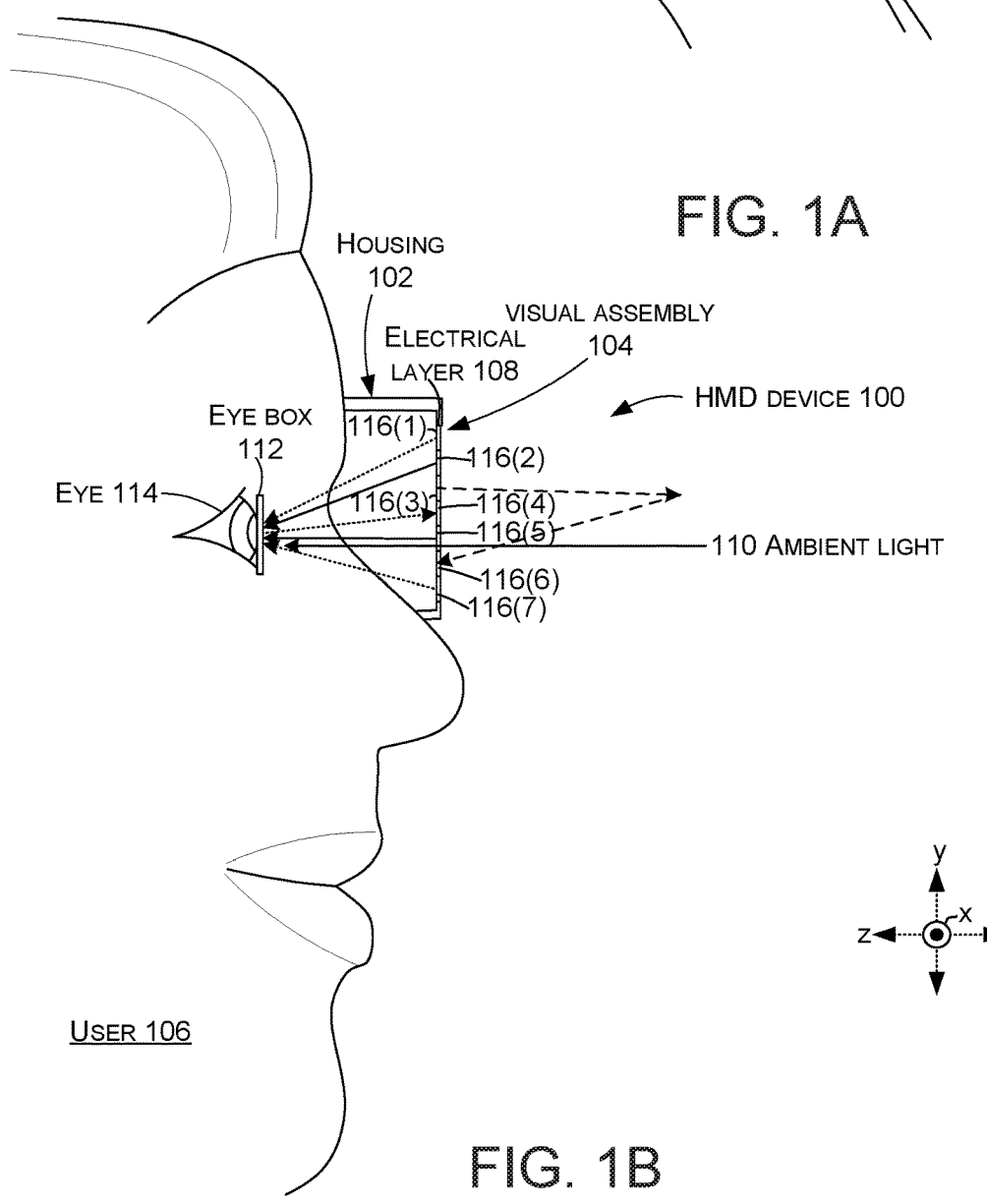
FIGS. 1B, 2, 3, 4, 5, 6, 7A-7D, and 8-16 illustrate elevational views of example HMD devices that are consistent with some implementations of the present concepts.

Introductory FIGS. 1A and 1B collectively depict an example HMD device 100 which can implement the present concepts. HMD device 100 can include a housing 102 that can orient a visual assembly 104 relative to a user 106. In some cases, the visual assembly 104 can include an electrical layer 108. In some implementations, the visual assembly 104 can be transparent in that it can allow ambient light 110 to pass through and reach an eye box 112 associated with the user's eye 114. The transparent visual assembly 104 can also include side-by-side electronic components 116 distributed on the electrical layer 108. The term side-by-side is used to indicate that the electronic components are positioned adjacent to one another on the electrical layer 108 either abutting or with gaps in between.

The electronic components 116 can perform various light generation and light detection functions. For instance, electronic components 116(1) and 116(7) can generate non-visible light (shown as dotted lines), such as infra-red (IR) light that can be directed toward the eye box 112 to gain information about the user's eye 114. Electronic component 116(4) can detect the non-visible light reflected from the user's eye to gain information about the user's eye. Electronic component 116(3) can generate non-visible light (shown as dashed lines), such as infra-red (IR) light that can be directed toward the environment to gain information about the environment. Electronic component 116(6) can detect the non-visible light returned from the environment to gain information about the environment, such as by 3D sensing/mapping. Electronic components 116(2) and 116(5) can generate visible light (shown as solid lines) that can be directed toward the eye box 112 to collectively generate a virtual image. These are just some of the types of example electronic component types that can occur on the electrical layer 108. Other examples are described below relative to FIG. 2.

As mentioned above, in some implementations ambient light 110 can pass through the virtual assembly 104 so that the user can see both the actual physical environment and virtual content (e.g., augmented reality) generated by a subset of the electronic components 116. Each type of electronic component 116 can be distributed and dispersed across the electronic layer (e.g., can have neighbors of different electronic component function). This aspect will be described in greater detail below relative to FIGS. 2 and 3. This configuration can be contrasted with traditional technologies that employ eye tracking and depth sensing components around a periphery of the HMD device, but not in the device's FoV.

In some virtual reality scenarios, the visual assembly 104 may not be transparent, but the electrical layer can be transparent. For instance, eye tracking electronic components on the electrical layer would not degrade visual images from a display positioned away from the user in the visual assembly relative to the electrical layer 108.

Note also that for ease of illustration and for sake of brevity, FIG. 1B as well as some of the subsequent FIGURES show only one of the user's eyes and part of the visual assembly 104 in front of the eye. However, the described concepts can be applied to both the left and right eyes by the HMD device 100.

Figure 2:
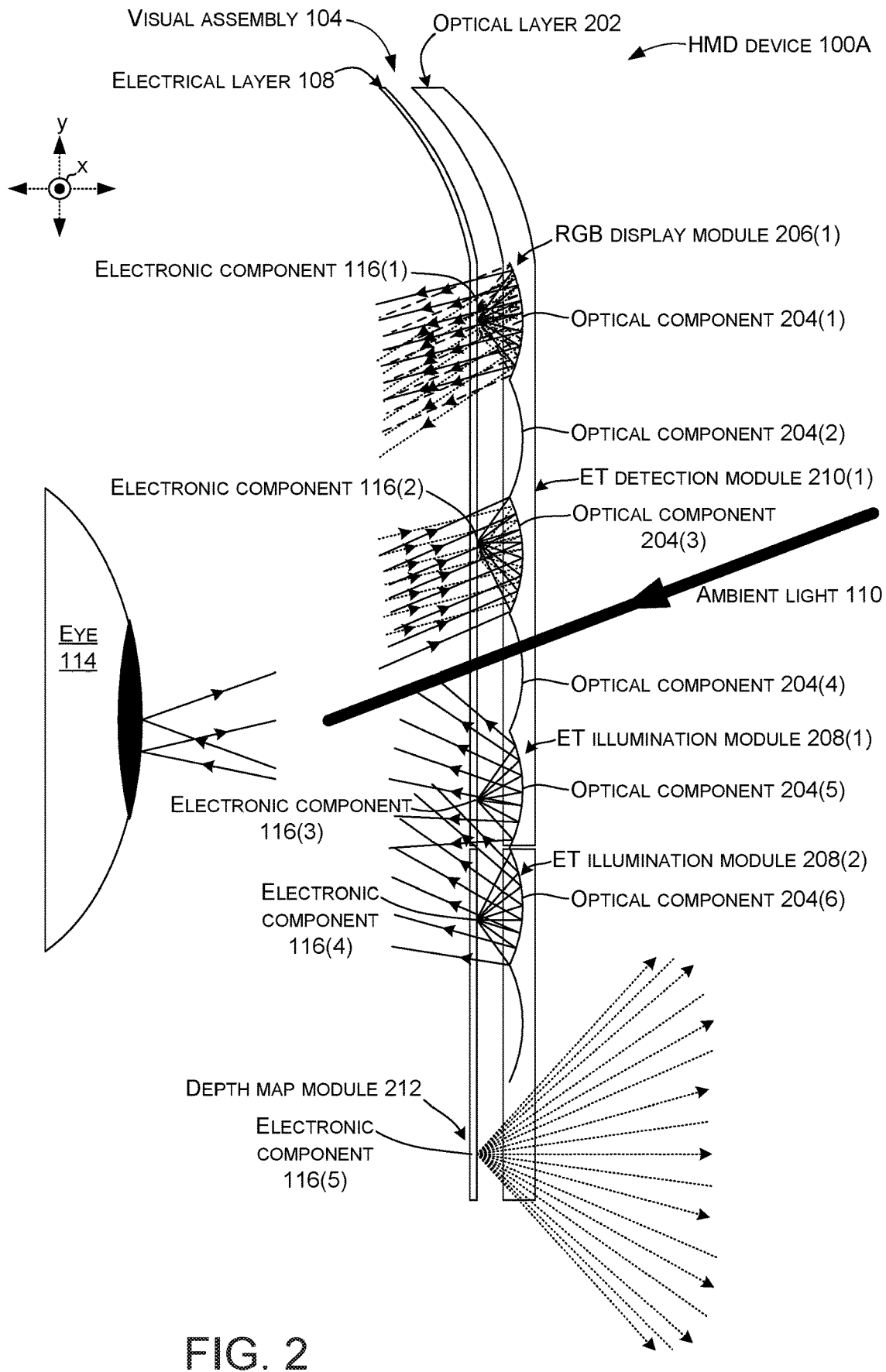

FIG. 2 shows another example HMD device 100A. (The suffix, such as 'A' is used relative to HMD device 100A for purposes of distinguishing this HMD device from HMD device examples above and below. The various HMD device examples may have different and/or additional elements and/or some elements may be different in one implementation compared to other implementations.) In this case, the visual assembly 104 can include an optical layer 202. In this configuration, the optical layer 202 is positioned away from the eye 114 relative to the electrical layer 108. In other configurations, the optical layer 202 could be positioned on the opposite side of the electrical layer 108.

The optical layer 202 can include multiple optical components 204 that can be positioned side-by-side to one another on the optical layer. The optical components 204 can be configured to affect a path of some or all wavelengths of light that encounter an individual optical component. For instance, the optical components 204 can be manifest as mirrors and/or lenses. The optical components 204 can work cooperatively with the electronic components 116 to achieve various functionalities, such as eye tracking, image generation (e.g., RGB display), and/or 3D mapping, among others. Note that the optical components 204 and the electronic components 116 tend to be very small and as such are not drawn to scale and/or in the numbers that would likely be present on the visual assembly 104, but the illustrated optical components 204 and the electronic components 116 serve to convey the present concepts.

In this example, electronic component 116(1) and optical component 204(1) operate cooperatively to contribute to RGB image generation and thus can be viewed as an RGB display module 206(1). The electronic component 116(1) can entail a red, green, blue (RGB) display (e.g., pixel cluster), such as a light emitting diode(s) (LED) that is configured to emit light in a direction away from the eye 114. In this case, the optical component 204(1) can be manifest as a partially reflective mirror or a notch filter. A partially reflective mirror can reflect certain wavelengths of light while being transmissive to other wavelengths of light. Alternatively or additionally, a partially reflective mirror can reflect light received at certain angles while being transmissive to other angles. For instance, ambient light 110 traveling generally normal to the optical axis may pass through the partially reflective mirror 502(1). In contrast, the partially reflective mirror of optical component 204(1) can reflect the RGB light from the electronic component 116(1) back toward the eye 114. While only one RGB or single-color display module is shown, multiple dispersed and distributed RGB display modules 206 can contribute to the overall image perceived by the eye 114.

In the illustrated configuration, electronic components 116(3) and 116(4) can emit non-visible light for ET purposes. For instance, the electronic component 116(4) can be an IR LED or array of LEDs. This non-visible light can be emitted in a direction away from the eye and can be redirected back toward the eye by optical components 204(5) and 204(6), respectively that are manifest as partially reflective mirrors (e.g., hot mirrors), for instance. A hot mirror can transmit visible light while reflecting non-visible wavelengths, such as IR. Electronic component 116(3) and optical component 204(5) can function as an eye tracking illumination module 208(1) and electronic component 116(4) and optical component 204(6) can function as eye tracking illumination module 208(2). Note that electronic components 116(4) and 116(5) may emit the same wavelengths of non-visible light. In other configurations, these electronic components may emit different wavelengths of light from one another. Potential advantages of this latter configuration are described below relative to FIG. 15. Electronic component 116(5) can emit non-visible light for 3D mapping purposes and can function as a 3D mapping or depth map module 212.

Electronic component 116(2) can include a sensor that is sensitive to the non-visible light. The non-visible light can be emitted by ET illumination modules 208 and reflected back from the user's eye. The non-visible light can be received at optical component 204(3), which redirects the light toward the electronic component 116(2). Thus, electronic component 116(2) and optical component 204(3) can function as an ET camera/sensing/detection module 210(1).

Other electronic components can entail multiple components that collectively can both emit non-visible light, such as IR, and sense non-visible light that is reflected back from objects in the environment. For instance, the emitting component can entail an IR LED or LED array and the detector can entail an IR CMOS sensor, for example. The IR light can be structured light and/or can be sensed stereoscopically (e.g., by multiple detectors) to convey 3D information. These configurations can enable 3D mapping of the environment in front of the user. In some cases, the electronic component is not paired with an optical component in the optical layer 202 (e.g., does not need focusing). For instance, the non-visible light can be emitted evenly in a flood pattern that can be effective without redirecting of the non-visible light that could be provided by an optical component. However, in other implementations, an optical component, such as various types of mirrors and/or lenses, can be employed to affect the light emitted from the electronic component. In either configuration (e.g., without or without an optical component) the electronic component can be viewed as contributing to a module configured to achieve a functionality.

Two of the depth sensing techniques that can be accomplished with the present implementations can include time of flight (ToF) techniques and stereo techniques. Time of flight can rely on measuring the time light needs to travel from the source (e.g., the IR emitter of electronic component 116(5)) to the object and then back to the IR detector/sensor (e.g., camera) of electronic component 116(5). The sensor can measure the time the light has taken to travel and a value of the distance can be established. ToF techniques tend to utilize an optical pulse or a train of pulses. In addition, there is often a desire for the emitted beam to have a certain profile (this reduces "multipath" issues with the camera).

Using a multi-module architecture, it is possible to place the depth map LED or LEDs using the same arrangement as the LEDs for eye tracking but facing the real world. The same techniques used in eye tracking can be used for illuminating the real world. However, if a more "structured illumination" is desired, it is possible to have an array of LEDs that are partially collimated by a reflector. In that case, each LED can illuminate part of the real world and depending on the pattern desired, different LEDs can be activated. Structured illumination can be achieved by means of a partially reflective optical surface that combines a collimating component and a diffractive optical element (DOE) that creates the structured illumination pattern.

In the illustrated configuration, the ET illumination is accomplished with ET illumination module 208 and ET detection is accomplished with ET detection module 210. In contrast, depth map module 212 provides both illumination and detection functionalities in a single module. In a similar fashion a single ET module could combine the components of ET illumination module 208 and ET detection module 210 into a single module. Such a configuration is described below relative to FIG. 3 and FIG. 11.

The description above explains that the present concepts allow for pick and match electrical and optical components as modules to achieve desired functionalities, such as RGB display modules, depth sensing modules, and/or eye tracking modules, among others. These modules can be distributed and dispersed across the visual assembly 104 so that each functionality is achieved without compromising other functionalities. For instance, the eye tracking modules do not (perceptibly) compromise the quality of the RGB display perceived by the user. This distributed and dispersed module placement is described in more detail below relative to FIG. 3.

From another perspective, the present concepts offer a pallet of different components that can be unobstructive or minimally obstructive to the user so that the user can still see the environment (e.g., receive ambient visible light from the environment without noticeable interference). For instance, the electronic components 116 can have dimensions in the x and y reference directions less than 200 microns and in some implementations less than 100 microns, and in some implementations less than 10 microns. Electronic components of this size are so small that they are not visible to the user and are small enough that the user tends not to perceive any visual degradation of real-world images formed from ambient light 110 passing through the visual assembly 104 as long as the components are dispersed rather than clumped together.

Depending on the HMD design parameters, different electronic and/or optical components can be placed in front of the user across (e.g., interspersed throughout) the visual assembly 104. These components can achieve various functionalities including: ET detection, ET illumination, monochrome display, RGB/multicolor display, and/or IR depth sensing, among others, while permitting ambient light to pass through to the user's eye. The electronic components, given their diminutive size may not individually have the emitting or detecting capabilities of larger (e.g., traditional macroscopic components). However, the components can be operated collectively. For instance, individual electronic devices can contribute to a portion of the eye box rather than the entire eye box. When analyzed collectively the distributed arrangement of the electronic components can provide high quality RGB images, eye tracking, and/or 3D mapping, consistent with specified design parameters.

The visual assembly 104 can be manufactured utilizing various techniques. For instance, the electrical layer 108 and the optical layer 202 can each be formed individually and then associated with one another. The electrical layer 108 can be made on a plastic (e.g., first) substrate with transparent wires (e.g., Indium Tin Oxide (ITO) lines). Using pick and place, different electronic components can be soldered on this substrate. ITO wires could be used in a "bus arrangement" so that the number of electrodes is reduced/minimized.

The optical layer 202 can be used to collimate light, focus, defocus and/or diffuse light. The optical layer can include multiple lenses, mirrors, and/or diffraction elements/components that can be positioned on, and/or formed from, a substrate (e.g., second substrate). For example, light from the ET IR LEDs could be partially collimated by mirrors and/or lenses so it more effectively covers the eye box. Alternatively, light from an RGB display could be collimated so it acts as a near eye display. Once completed, an adhesive (not specifically shown in FIG. 2) can be applied to one or both of the electrical layer 108 and the optical layer 202 and they can be secured together. This configuration lends itself to both planar visual assemblies (in the xy reference directions), curved visual assemblies, and visual assembly implementations that include both planar regions and curved regions as illustrated in FIG. 2.

Figure 3:
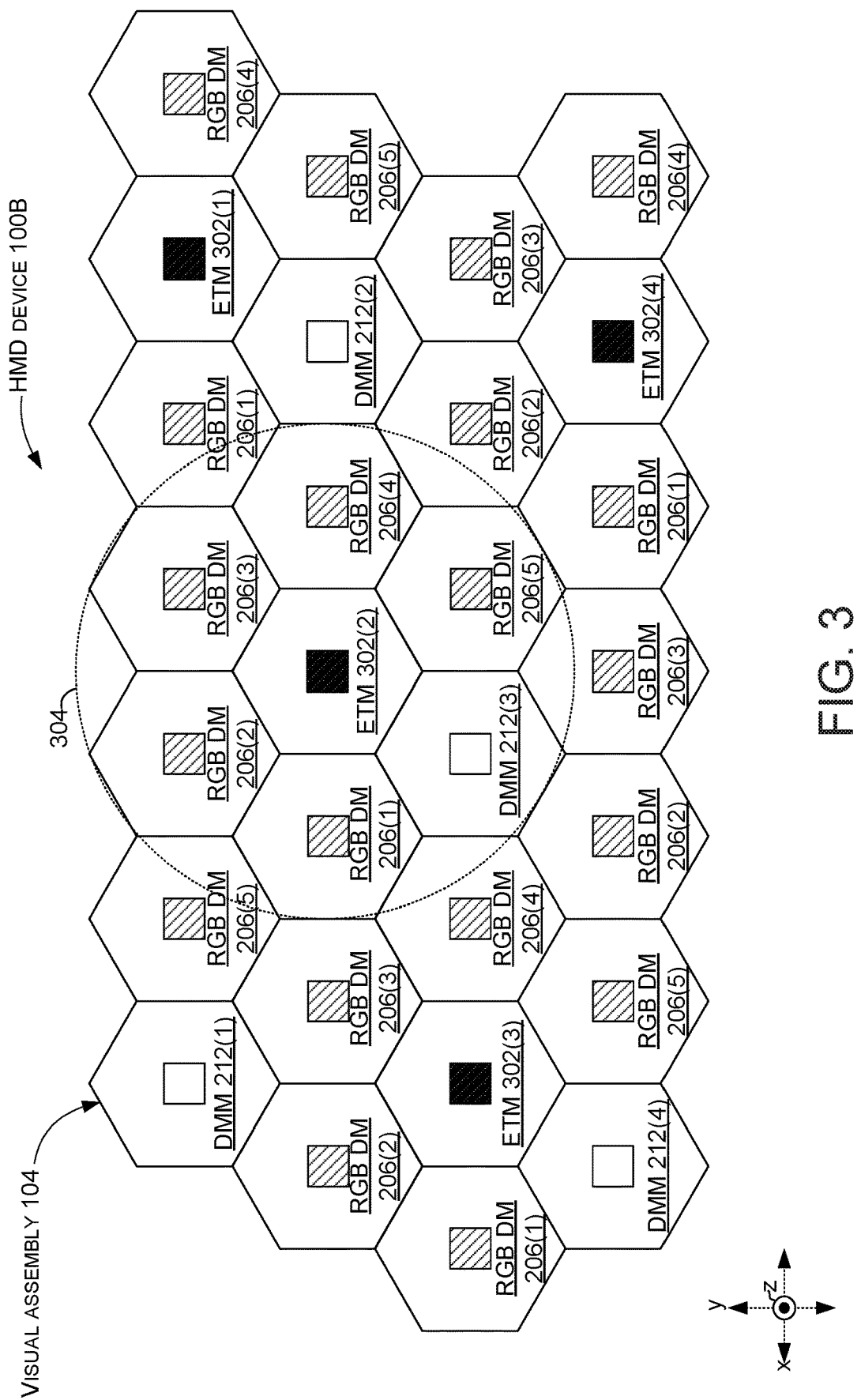

FIG. 3 shows another example HMD device 100B that includes a major surface (generally along the xy reference plane) of the visual assembly 104. This view shows how the various modules introduced relative to FIG. 2 can be distributed and dispersed on the visual assembly 104. In this implementation, the ET illumination module 208 and ET detection module 210 of FIG. 2 are replaced by a single ET module 302. However, the description is equally applicable to the separate and distinct modules 208 and 210 described relative to FIG. 2.

In this configuration, the various modules are placed side-by-side (e.g., adjacent to one another). A majority of the modules can be dedicated to generating an RGB image for the user (e.g., RGB display modules 206). Other module types can be interspersed with the RGB display modules 206. This interspersing of module types can occur across the entire visual assembly 104 rather than just on the periphery because the size of the modules can be small enough that not all modules are required to contribute to RGB image generation and the modules do not interfere perceptibly with RGB light and/or ambient light.

In the illustrated case, modules can be arranged and managed in groups of seven that approximate a circle as indicated at 304. In this case, five of the seven positions in the circle are occupied by RGB display modules 206(1)-206(5). One position is allocated to eye tracking module 302(2) and the last position is allocated to depth mapping module 212(3). Because of the small size of the modules, this configuration can provide the same visual experience as if all seven positions were occupied by RGB display modules 206. Note that this illustrated configuration is provided for purposes of example and many other ratios of modules can be employed beyond the illustrated 5:1:1 ratio. For instance, another implementation can manage a 10×10 array of modules and employ 98 RGB display modules to one eye tracking module and one depth mapping module, for example.

One aspect of the inventive concepts is the use of an array of mini-lenses and/or mini-mirrors. Each lens can be used as a mini projector or a mini camera. This means that traditional eye tracking cameras and traditional eye tracking illuminators can be replaced by a group of ET modules that are interspersed across the visual assembly, such as among the RGB display modules (e.g., dispersed and distributed among the RGB display modules) and collectively contribute to the eye tracking functionality. Similarly, a traditional infrared (IR) illuminator for the environment can be replaced by a group of depth map modules that are interspersed among the RGB display modules (e.g., dispersed and distributed among the RGB display modules) and collectively contribute to a depth mapping functionality.

As mentioned above, one difference between solutions based on the present concepts and traditional solutions is the small size (e.g., visually imperceptible) and the "distributed" nature of the modules. This allows the visual assembly to have more flexibility and significantly smaller thickness (e.g., thinner).

Figure 4:
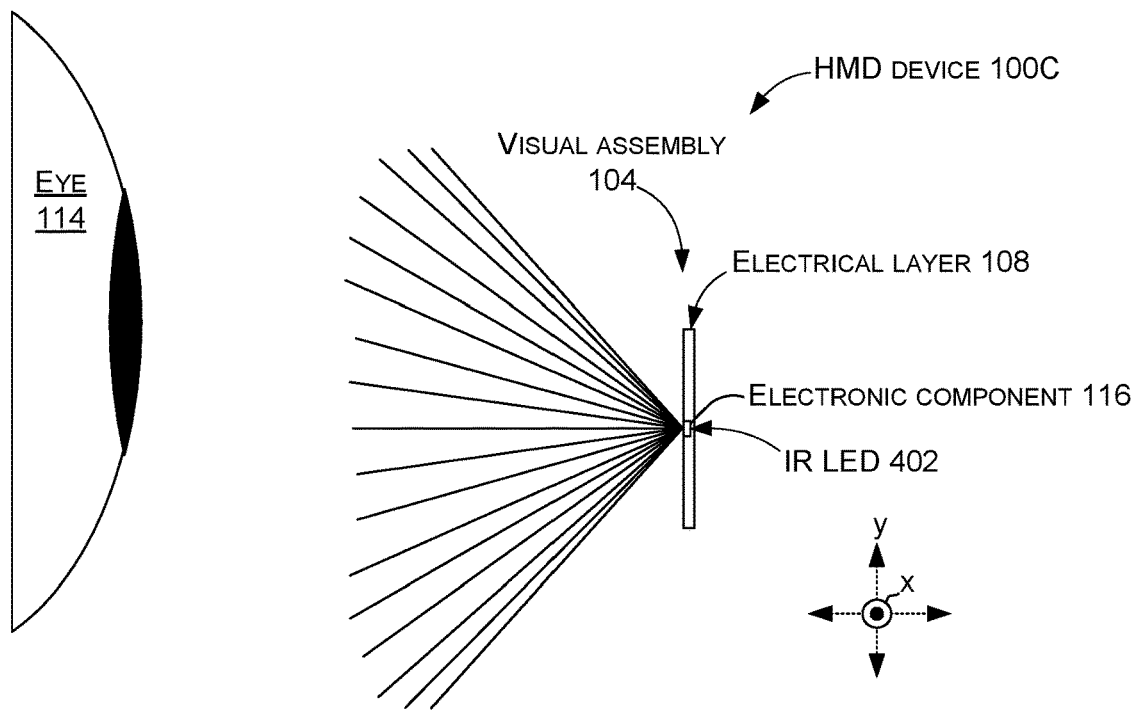
Figure 5:
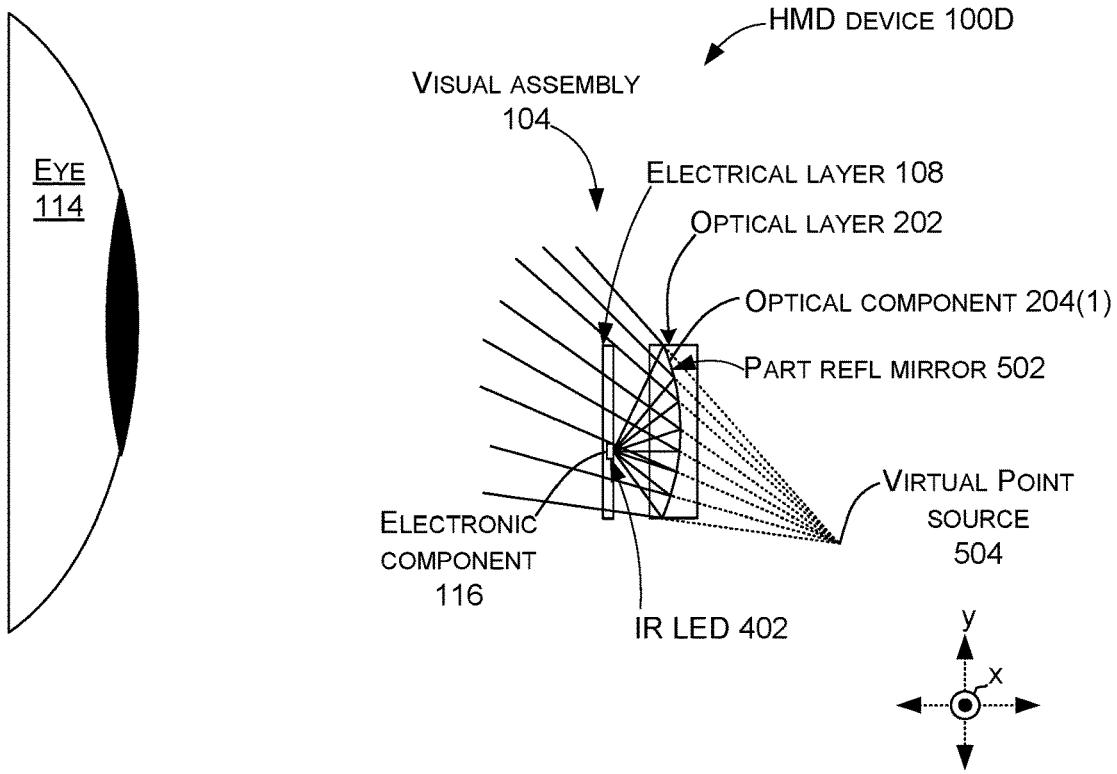
Figure 6:
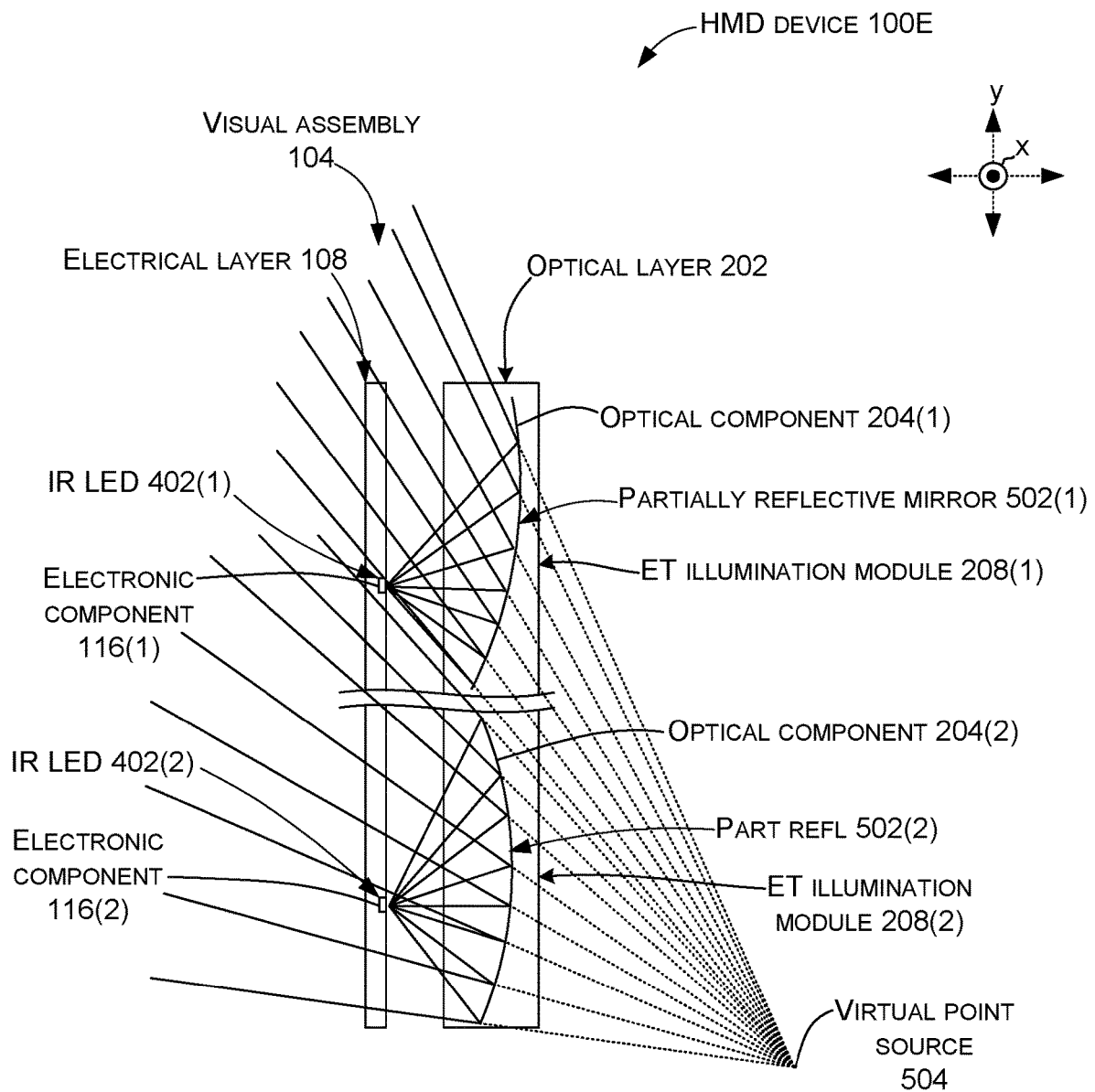
Figure 7:
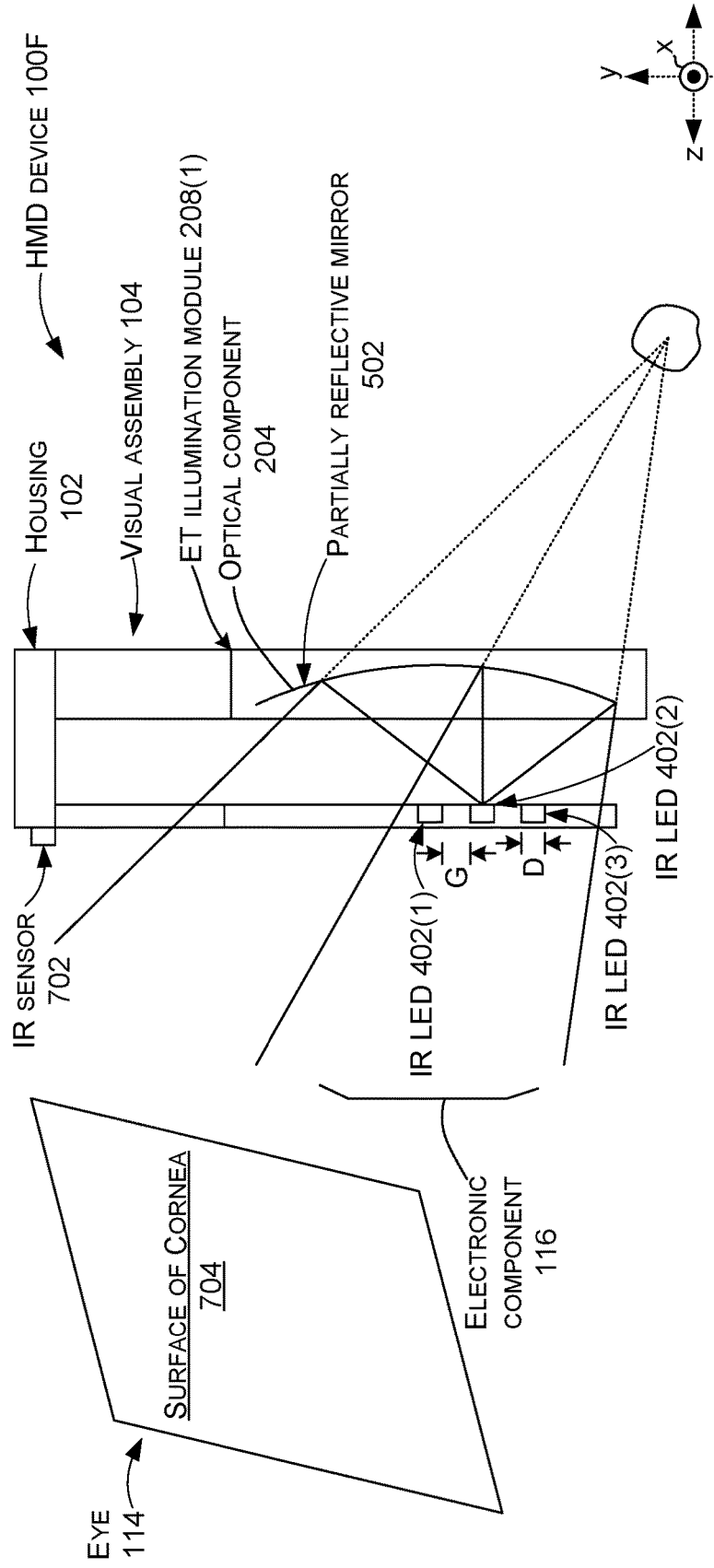

FIGS. 4-6 show more details of example HMD devices relating to eye tracking. Eye tracking can be essential in many HMD devices. It can be used to understand the user's interaction with the environment and can be used as an input device. Many existing HMD devices can use eye tracking to improve image quality as the image is optimized for the specific location of the user's eye.

There are many existing eye tracking techniques. One of the most common existing techniques uses a ring of IR LEDs along the periphery of the visual assembly. The IR LEDs behave like point sources and emit light towards the user's cornea. Light from the cornea is reflected towards a camera. By imaging the reflection of the LEDs, a ring is formed into the camera and the position of the cornea (and thus of the eye) can be determined.

Reflecting LEDs on the cornea works well. However, there is a major drawback of this traditional technique. The traditional system performs better when both the camera and the LEDs are in front of the user. This is of course challenging for a VR or AR display where the user should not have any occlusions between their eye and the HMD device's optics. The traditional approach is to bring the ET camera as close to the nose as possible while attaching the LEDs in the rim of the display optics (waveguide or refractive optics). These traditional implementations work well; however, as the display optics increase in size (for covering a larger FoV) and the display becomes thinner (for ID purposes) the LEDs move way too close to the eyebrows and cheeks while the camera sees the reflections at a very oblique angle.

The present concepts offer improved performance. As introduced above relative to FIGS. 2 and 3, a potentially key aspect of the inventive concepts is the use of many and smaller (e.g., microscopic) light sources and detectors distributed and dispersed across the visual assembly 104. By using multiple distributed pairs of components to create the illumination and detection of the glint, the LEDs and detectors can be sufficiently small (e.g., less than 100 um) to become invisible to the human eye.

In FIG. 4 the visual assembly 104 of HMD device 100C includes electrical layer 108. A portion of the electrical layer 108 is shown with one electronic component 116 positioned in front of the eye 114 in the user's field of view (FoV). In this case, the electronic component 116 is an IR LED 402 that is oriented to emit IR light directly toward the user's eye 114. This configuration can achieve high efficiency because all of the IR light is directed towards the eye box (112, FIG. 1B).

FIG. 5 shows an alternative configuration on HMD device 100D where the electronic component 116 is manifest as IR LED 402 that is positioned in the user's FoV. IR LED 402 is oriented to emit IR light away from the user's eye 114. In this case, optical layer 202 includes optical component 204 in the form of a partially reflective mirror (e.g., hot mirror) 502. The partially reflective mirror 502 can reflect the IR light back toward the user's eye 114. The partially reflective mirror 502 can have an optical shape that reflects the IR light back toward the user's eye in a pattern that mimics the IR light being emitted from a virtual point source 504 that is farther from the eye than the visual assembly 104. Thus, the use of the partially reflective mirror 502 allows the HMD device 100D to be positioned closer to the user's eye while still generating the desired eye tracking IR patterns on the user's eye 114.

The illustrated configuration directs IR light away from the eye and reflects the IR light from partially reflective mirror (e.g., hot mirror) and towards the eye. While this indirect route may reduce efficiency (as the reflector may be less than 100% efficient) it allows for creating a virtual source that may be more convenient for ET purposes. In addition, multiple lenses can be used to create the same virtual source but formed by multiple emitters. This aspect is shown in FIG. 6.

FIG. 6 shows an alternative configuration on HMD device 100E that builds upon the concepts discussed relative to FIG. 5. This configuration shows two IR LEDs 402(1) and 402(2) associated with electronic components 116(1) and 116(2), respectively. Note that a discontinuity is shown in the visual assembly 104 to indicate that there can be intervening electronic components and optical components that are discussed above relative to FIGS. 2 and 3, but are not shown to avoid clutter on the drawing page.

In this case, the partially reflective (e.g., hot) mirrors 502(1) and 502(2) are configured to operate with their respective IR LEDs 402(1) and 402(2) to collectively create an IR image extending toward the user's eye. For instance, each IR LED and hot mirror pair (e.g., ET illumination module 208) can illuminate a portion of the eye box (112, FIG. 1). Stated another way, the partially reflective mirrors 502(1) and 502(2) collectively create an IR image that appears to emanate from a single point source (e.g., virtual point source 504). This single image can provide more complete reflection and hence more information about a larger portion of the eye (e.g., eye box) than can be achieved with a single IR LED 402. Alternatively, both IR illumination modules could be directed to the same portion of the eye box to create a higher intensity IR image at that portion than could be achieved with either IR illumination module alone. In either case, a single ET illumination module 208 is not required to solely illuminate the entire eye box. Higher light intensity can be achieved by focusing individual illumination modules 208 on individual areas of the eye box so that collectively the entire eye box is covered with IR light of a desired intensity, even though none of the individual modules in isolation have such capability.

The implementations described above include a single electronic component 116 of a given type, such as LEDs, per optical component 204. Other implementations can have multiple electronic components 116, such as LEDs associated with individual optical components 204, such as partially reflective lenses. These LEDs can be controlled in various way to achieve various functionalities. For instance, all of the LEDs could be powered on and off simultaneously for eye tracking illumination to achieve higher IR intensity.

In other cases, the LEDs could be controlled separately. For instance, the LEDs could be powered on and off sequentially. These LEDs can be used; (a) for forming part of a sensing ring of IR LEDs along the periphery of the visual assembly; and/or (b) be wobbulated so the performance of the device increases (e.g., increase in resolution or determination of other optical properties, like the position on the cornea illuminated). Such a configuration is described below relative to FIGS. 7A-7D.

FIGS. 7A-7D collectively show details relating in inventive concepts introduced above. FIG. 7A shows another example HMD device 100F. FIGS. 7B-7D show representations of emitted and sensed IR light from the HMD device 100F. In this implementation, HMD device 100F can be viewed as a hybrid device that has IR LEDs distributed and dispersed on the visual assembly. IR reflections from the user's cornea 704 can be captured by one or more IR sensors (e.g., cameras) 702 that are positioned around the periphery of the visual assembly 104, such as on the housing 102.

In this configuration, multiple (e.g., three) IR LEDs 402 are positioned in eye tracking module 302. The IR LEDs 402 can have dimensions D in the x and y reference directions of anywhere from 10 microns to 200 microns and thus are not visible to the user. The IR LEDs 402 can be positioned close together as indicated by gap G, such as in tens to hundreds of microns apart. The space between the IR LEDs can be occlusive if their separation is on the smaller end or transparent if their separation is larger end.

The multiple IR LEDs 402(1)-402(3) can be switched on sequentially or simultaneously. When switched on sequentially there is less demand on the spatial response of the IR sensor (e.g., camera) 702 and/or the IR LEDs. When switched on simultaneously there is more demand on the temporal response of the IR sensor and IR LEDs. In some configurations, such as the wobbulation configuration mentioned above, during a sampling period or cycle, each IR LED is activated for a subset of the cycle (e.g., in this example one-third of the cycle). The sensed IR reflections can be analyzed collectively to provide more accurate eye information than can otherwise be obtained.

The three IR LEDs 402 in this example form a simple triangle. By detecting the shape of the triangle at the IR sensor 702, other parameters of the HMD device 100F can be determined. For instance, these parameters can include the distance between corneal surface 704 and the ET module 302 (e.g., between the eye and the electronic components 116). This distance information can also provide information about a local slope of the eye/cornea. While one ET illumination module 208 may, by itself, not allow the IR sensor 702 to provide accurate distance, position, and/or slope information, multiple ET illumination modules 208 distributed and disbursed with multiple ET sensing modules can provide information sensed by the IR sensor 702 that when analyzed collectively is accurate.

FIG. 7B shows a representation of sequential IR emissions 706 from IR LEDs 402(1), 402(2), and 402(3). FIG. 7C shows a representation of the IR detections 708 of the IR emissions 706 as captured by IR sensor 702. FIG. 7D shows a representation of the IR detections 708 superimposed on the IR emissions 706. The differences or deltas 710 show changes in shape, location, and angular orientation. These changes can be caused by the user's eye and can provide useful information about the eye location, shape, etc. at a resolution greater than would otherwise be achieved.

One example technique for obtaining this higher accuracy eye information can utilize the three sequential IR detections 708. The detected images can be deconvolved to produce a high-resolution image, even though the individual images are relatively low resolution. Deconvolution can be used to improve the modulation transfer function (MTF)/point spread function (PSF) of a low-quality optical system. One such technique can employ multiple IR detectors rather than a single detector. The combination of multiple LEDs being controlled and sensed by multiple detectors will provide more accurate information about the eye.

One such example multi-detector is a quadrant detector. Quadrant detectors have four active photodiode areas defining four quadrants. The four active photodiode areas can sense the centroid of an object (e.g., blob) in the four quadrants. Quadrant detectors operate at high frequencies, such as mega Hertz frequencies. As such, quadrant detectors can be used to detect fast eye movement, such as saccades. Some implementations may employ charge coupled devices (CCDs) or complementary metal oxide semiconductors (CMOS) sensors for general IR imaging purposes and quadrant detectors for detecting rapid eye movements.

The same or similar approach described above can be used to reduce the requirement for the IR sensor 702. For example, by using an IR sensor with, for example, 10×10 pixels and an IR LED array of (12×12) pixels the resolution could be enhanced to approximately1 20×120 pixels. Effectively getting N×M super-resolution where N is the number of IR detectors and M is the number of IR LEDs to get increased resolution in eye position.

The present concepts also provide enhanced pupil imaging for both "bright pupil" (retinal retroreflection) imaging and "dark pupil" imaging. Retinal retroreflection relates to the IR light that reflects off the retina straight back toward the source. When the IR sensor is close to the IR source and both are close to the optical axis, retinal retroreflection is more effective. Due to demographic differences, some pupils are easier to image with dark pupil while some are easier to image with bright pupil imaging. Bright pupil methods tend to work better for some demographics than others. However, dark pupil imaging tends to work better for other demographics. The present concepts can position IR emitters and IR sensors throughout the optical assembly including proximate to the optical axis. Thus, the present concepts can enable employment of both of these techniques via multiple distributed IR LEDs 402 and multiple IR sensors 702 to achieve accurate eye tracking regardless of the user demographics.

Figure 8:
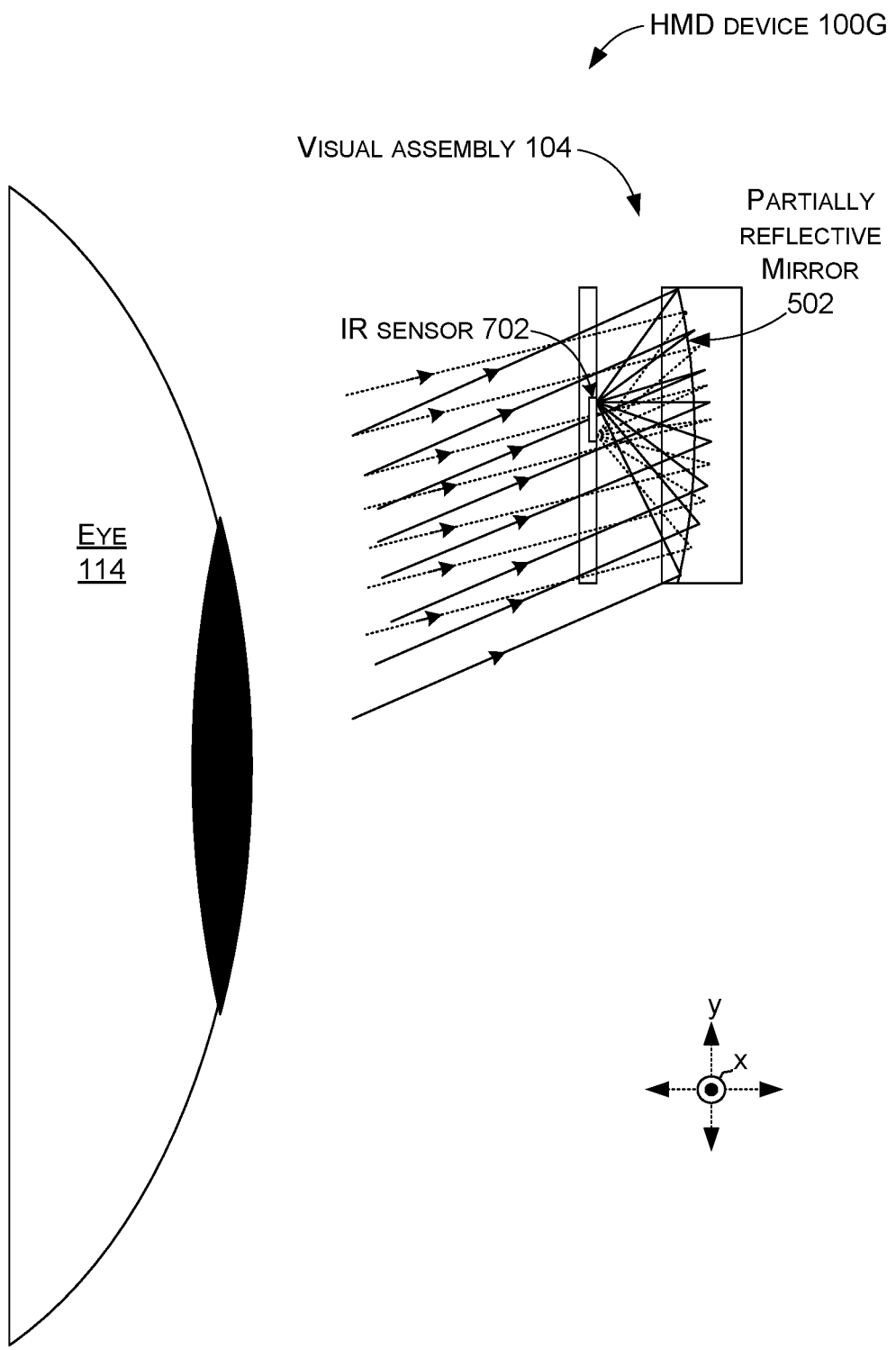

FIG. 8 shows another example HMD device 100G that illustrates that an IR sensor 702 can sense a portion of the eye box via partially reflective mirror 502. The partially reflective mirror 502 can function as the IR sensor's lens in the illustrated configuration. The IR sensor 702 can be a single IR sensor, or multiple IR sensors. For instance, the detector could be an IR photodetector array. The use of multiple IR sensors operating cooperatively can provide higher resolution data than a single sensor as described above and below.

Figure 9:
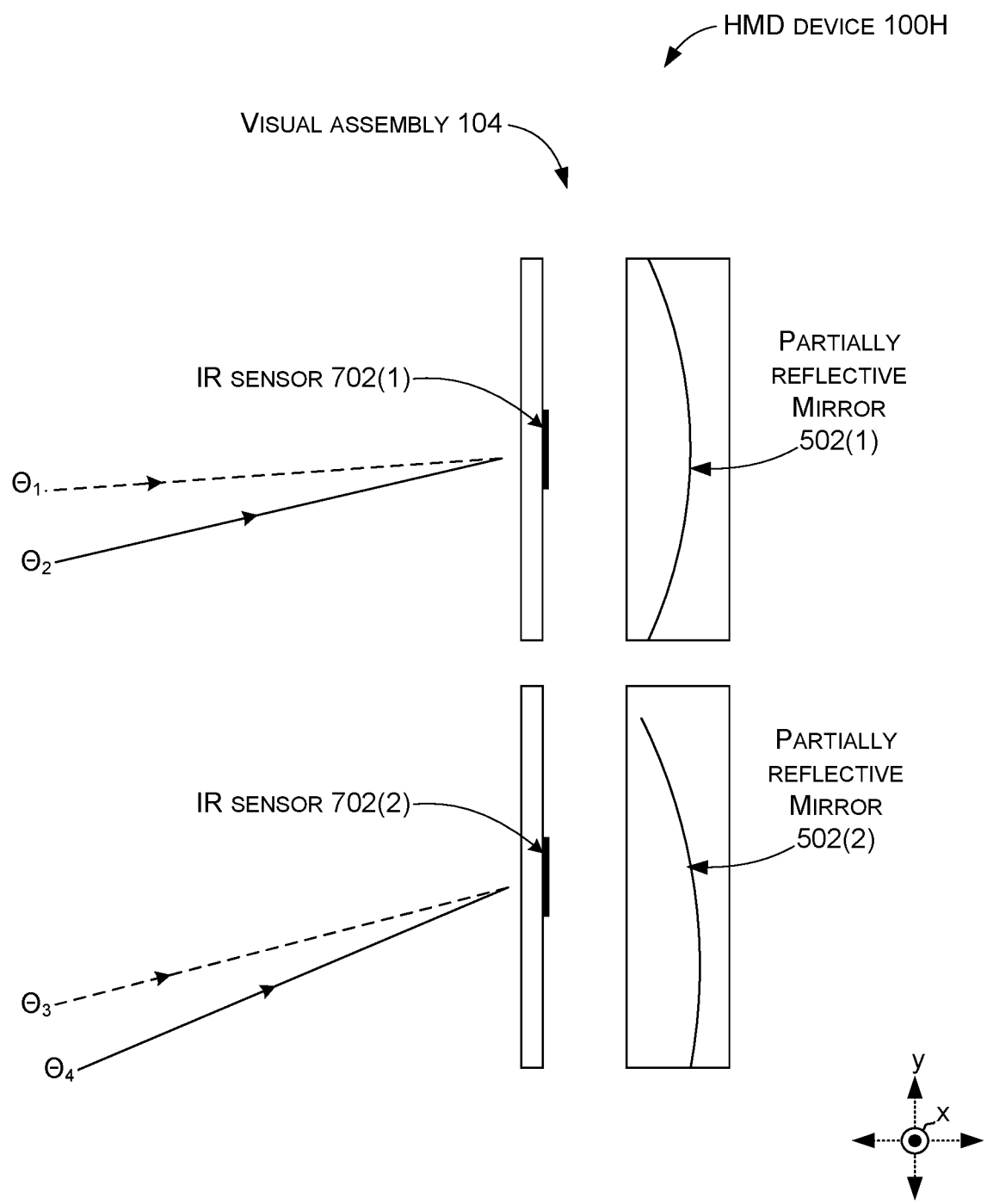

The illustrated IR sensor 702 can sense an individual portion of the eye box while other IR sensors sense other portions of the eye box. FIG. 9 illustrates this aspect. In FIG. 9, HMD device 100H is similar to HMD device 100G except that two IR sensors 702 are illustrated with two partially reflective mirrors 502. The orientation of individual partially reflective mirrors 502 can be adjusted so that each IR sensor and partially reflective mirror pair senses a different part of the eye box. This difference in orientation causes IR sensor 702(1) to receive IR light at angles one and two and IR sensor 702(2) to receive IR light at angles three and four. The entire eye box can be sensed by integrating the data from the various IR sensors. While only two IR sensors and partially reflective mirror pairs are illustrated, hundreds or thousands of pairs may be employed.

Figure 10:
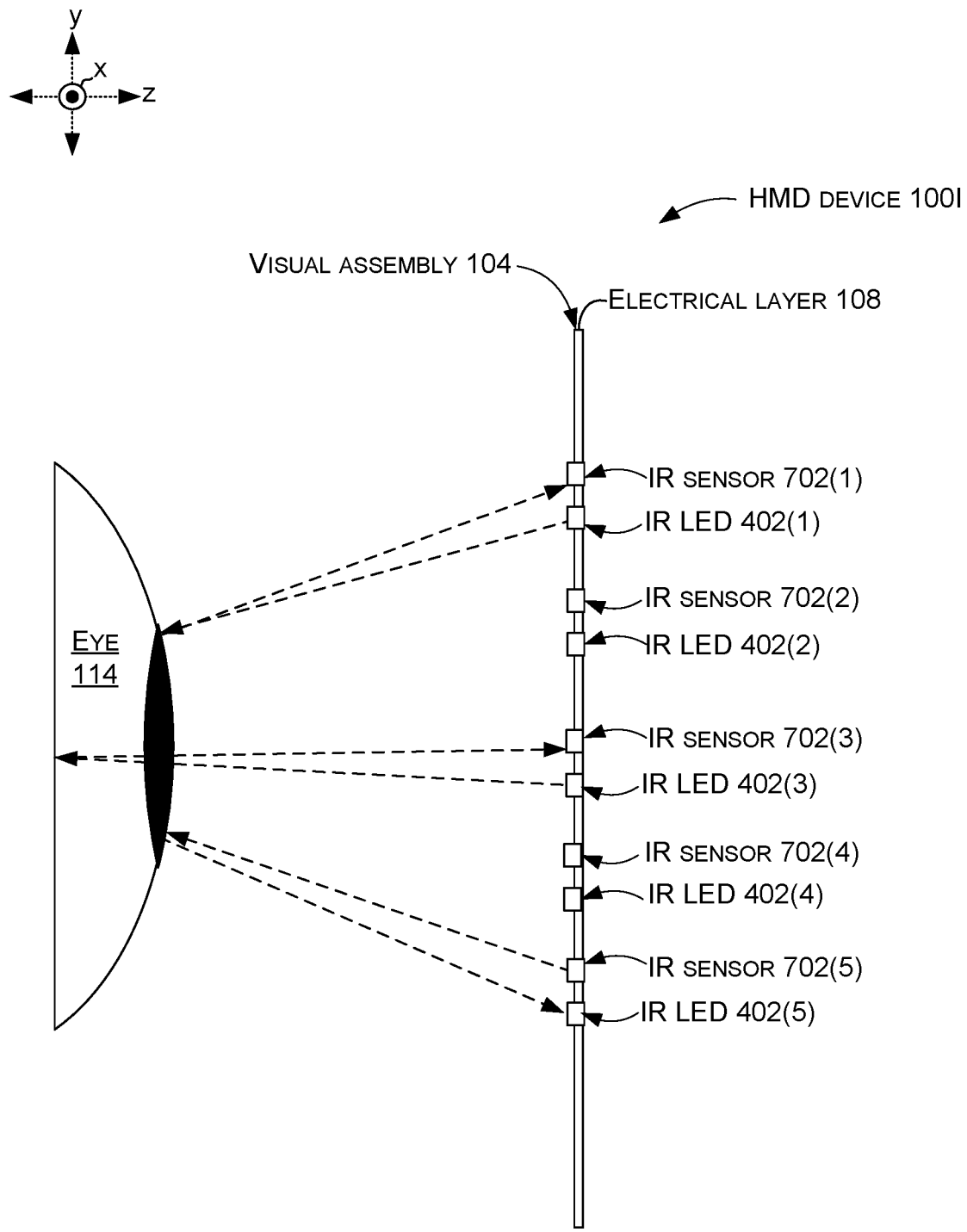

FIG. 10 shows another example HMD device 100I that illustrates how the present implementations can enable both bright and dark pupil imaging simultaneously using distributed and dispersed IR LEDs 402 and IR sensors 702. In this configuration multiple IR LEDs can emit light that upon reflection can be sensed by one or more of the IR sensors 702. At the illustrated point in time, IR LED 402(3) emitted light that reflected back from the user's retina and is sensed by IR sensor 702(3) and can be processed consistent with bright pupil techniques. Meanwhile, IR light from IR LED 402(1) could be sensed by IR sensor 702(1) and processed consistent with dark pupil techniques. Finally, the IR light from IR LED 402(5) is sensed by IR sensor 702(5) and can be processed collectively with information from IR sensor 702(1). This combination of emission and detection from IR LEDs and sensors interspersed across the visual assembly 104 can ensure accurate eye tracking throughout the user experience. This can occur even if some of them are blocked or do not provide determinative data because of eye color issues, eye lid position, etc.

Note that for ease of explanation, the electronic components of the electrical layer 108 have generally been illustrated in a single layer, such as an IR sensor 702 adjacent to an IR LED 402 along the xy reference plane. However, other implementations can stack electronic components in the z direction. One such example is described below in relation to FIG. 11.

Figure 11:
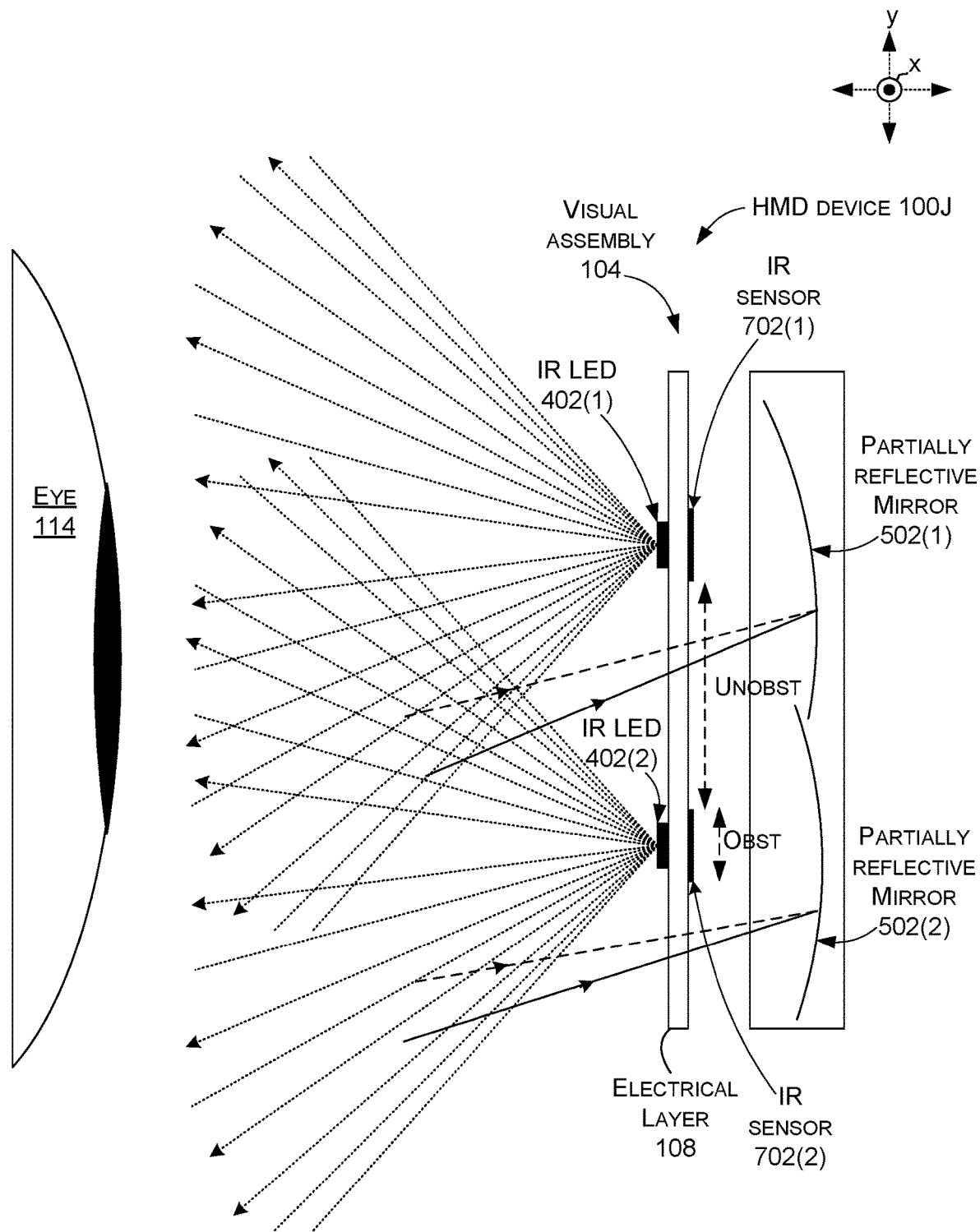

FIG. 11 shows another example HMD device 100J. In this case, IR LED 402 and IR sensor 702 are stacked in the z reference direction (e.g., parallel to the optical axis) on the electrical layer 108. In this configuration, the IR LED 402(1) is emitting light toward the eye 114. IR light reflected back from the eye is focused by partially reflective mirror 502(1) onto IR sensor 702(1). Similarly, the IR LED 402(2) is emitting light toward the eye 114. IR light reflected back from the eye is focused by partially reflective mirror 502(2) onto IR sensor 702(2). The electronic components may tend to obstruct ambient visible light from the environment more than those areas of the electrical layer without electronic components. Thus, stacking electronic components tends to increase the ratio of unobstructed areas to potentially or somewhat obstructed areas as indicated on FIG. 11.

In the same way that IR LEDs 402 can direct IR illumination towards the user, the IR sensor 702 may be configured to image a particular area of the eye box. Because of the simplicity of optics (a single reflector vs multiple refractive elements in an ET camera) the FoV of the IR sensor can be relatively small to reduce aberrations.

As mentioned, the field of view of each IR sensor 702 can be less than a traditional sensor positioned on the housing. This is not an issue because data from multiple sensors can be used to collectively capture the entire eye box. Note that in practice the FoV of the two (or more) lenses may require some overlap. This is because the lenses are not at infinity compared to the position of the eye and thus the potential need to capture a wider FoV per lens.

It is also possible to combine the use of the IR LED 402 and IR sensor 702 in a single lenslet. This configuration can minimize the occlusions caused as the LED and sensor occupy the same space. It may also bring some advantages in terms of geometry as the source and detector will be at the same point.

Note also that the present concepts offer many implementations. For instance, in HMD device 100J of FIG. 11, the IR LEDs 402 face toward the eye and the IR sensors 702 face the opposite way and receive IR light that is reflected from the user's eye and reflected again by the partially reflective mirror 502. Alternatively, the components could be swapped so that the IR LEDs 402 could emit toward the partially reflective mirrors 502. IR light reflected by the partially reflective mirrors 502 and again off of the user's eye could be detected by IR sensors 702 (potentially with the aid of a small lens, which is not specifically shown).

The same or similar arrangements can work with a transmissive or a combination of transmissive and reflective optical components. In addition, other optical components (diffractive, holographic, meta-optics) could be employed.

Consistent with the present implementations various coatings can be employed on the partially reflective mirrors 502 when ET and depth sensing IR illumination is used. For instance, the coatings can be dielectrics and tuned to a particular wavelength. That can improve the transparency of the combiner when used in an AR system.

It is also possible to combine the functions of ET, depth sensing and RGB display in a single element. This aspect is discussed in more detail below relative to FIG. 15.

Figure 12:
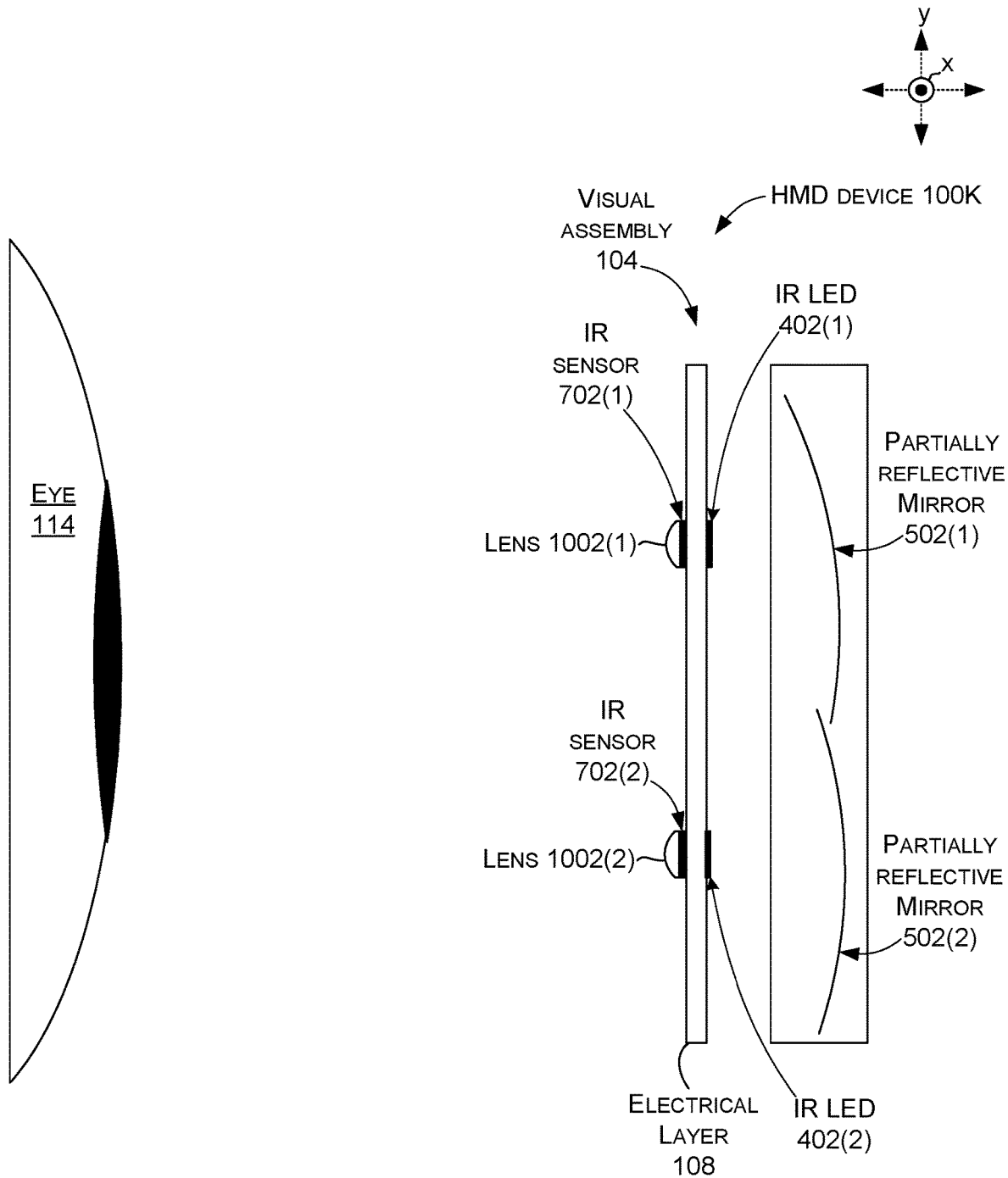

FIG. 12 shows an alternative arrangement to FIG. 11. In this case, the example HMD device 100K positions the IR LEDs 402 away from the eye 114. IR light emitted by the IR LEDs 402 is reflected back toward the eye by the partially reflective mirrors 502. IR light that reflects from the eye is focused by lenses 1002 onto the IR sensors 702.

The discussion above relative to FIGS. 2 and 3 explains that the present distributed and dispersed module concepts can be applied to eye tracking and depth sensing among other functionalities. FIGS. 4-12 explain detailed configurations of multiple implementations relating to eye tracking. Those details are also applicable to depth sensing. One such example is shown relative to FIG. 13.

Figure 13:
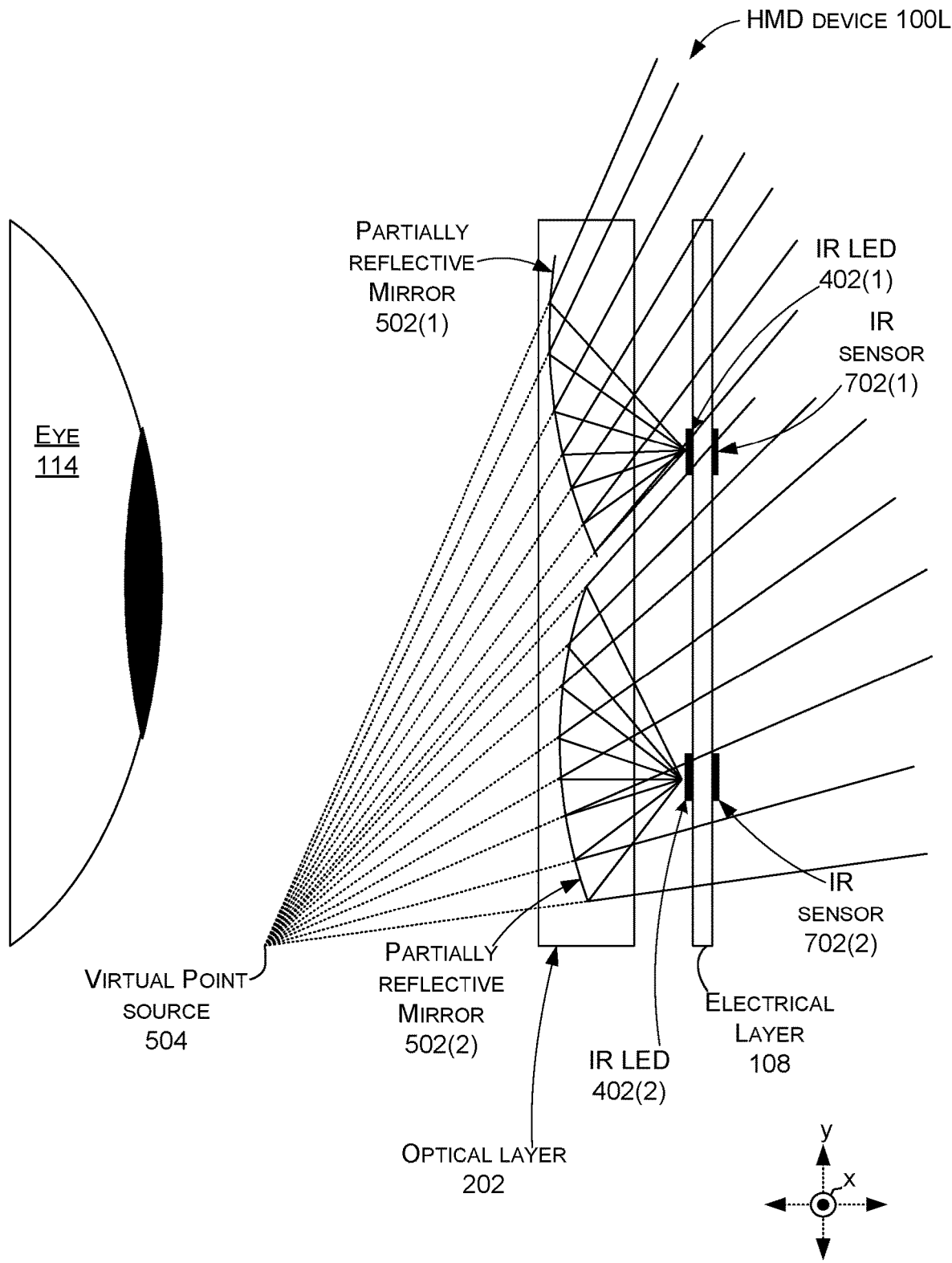

FIG. 13 shows another example HMD device 100L that can provide depth sensing on visual assembly 104. In this case the IR LEDs 402 are facing toward the eye 114. Partially reflective mirrors 502 on the optical layer 202 are oriented to reflect the IR light back toward the environment (e.g., away from the eye 114) as if the IR light was emitted from virtual point source 504 on the eye side. IR light reflected back from the environment can be detected by IR sensors 702, such as CMOS stereoscopic depth sensors, among others.

Figure 14:
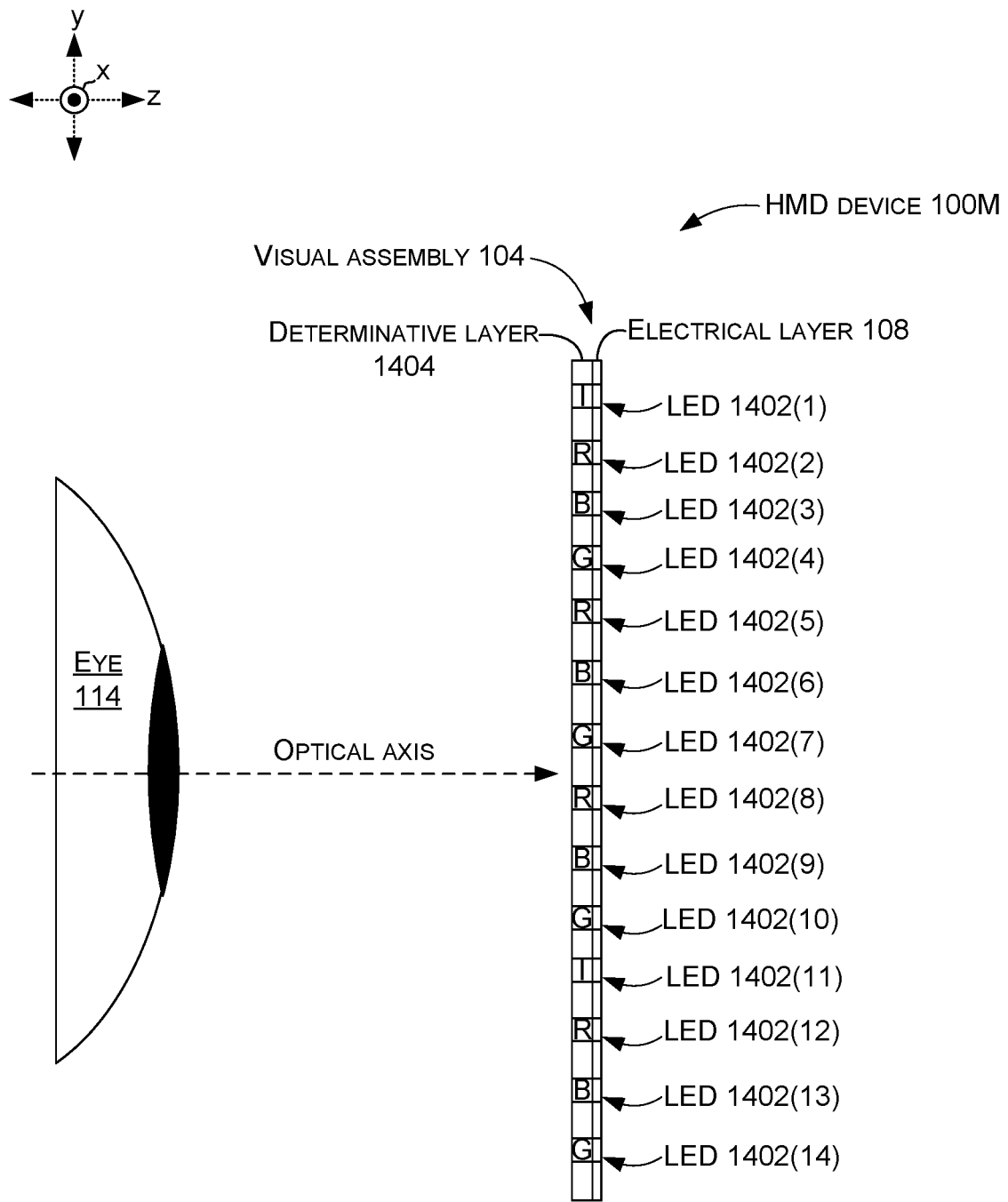

FIG. 14 shows another example HMD device 100M that can provide eye tracking and can generate color images to the user's eye 114. In this case, multiple LEDs 1402 are distributed across the electrical layer 108. In this configuration, all of the LEDs are the same in that they emit light with the same properties. A determinative layer 1404, such as a quantum dot matrix is positioned relative to the LEDs. The determinative layer can have localized differences that affect the light that passes through the determinative layer from the individual LEDs 1402. For instance, the determinative layer 1404 can cause emitted light from LED 1402(1) and 1402(11) to be IR (T, on the FIGURE) light, while light from the remaining LEDs can be dedicated to visible RGB light. Stated another way, the electronic components (e.g., the LEDs 1402) can be generic for multiple modules of the electrical layer 108. The determinative layer 1404 positioned over individual modules can define a functionality of the module, such as the wavelength(s) of light emitted by the module.

In some cases, the IR light can be uniformly emitted across the visual assembly 104 (e.g., a ratio of IR emitters to RGB emitters can be uniform across the visual assembly). In other cases, the ratios of visible light and IR light may be different for different regions of the visual assembly 104.

In one such example of the latter configuration, visible light may be produced in higher concentrations proximate to the optical axis (e.g., less IR light) for enhanced image quality. Further from the optical axis, a percentage of IR light to RGB light can increase. Stated another way, the ratio of RGB emitters to IR emitters can be higher proximate to the optical axis and lower farther from the optical axis. The user tends to look along the optical axis and foveal regions along the user's line of sight can have a higher concentration of RGB light output to provide a higher possible image quality that can be offered by high RGB density. Further from the optical axis, the user's visual acuity tends to be less and more resources can be dedicated to eye tracking without affecting the perceived image quality. In some device configurations, the IR/RGB ratios can be static (e.g., unchangeable). Other device configuration can offer dynamically adjustable ratios. For instance, the initial configurations can be dynamically changed in some configurations, such as if the eye tracking indicates the user is looking to the side rather than straight in front. Such an example device configuration is described relative to FIG. 15.

Figure 15:
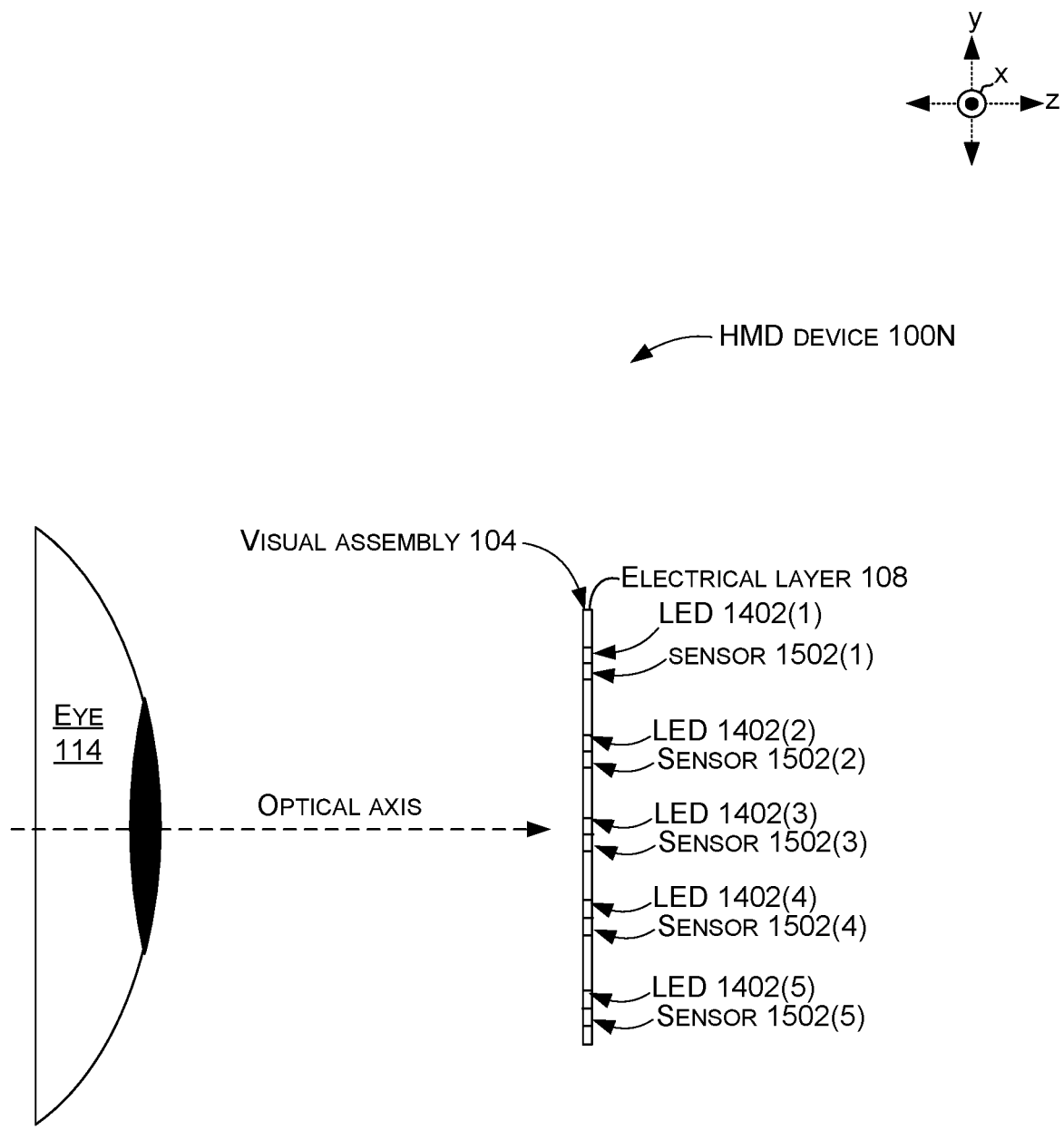

FIG. 15 shows another example HMD device 100N that can provide eye tracking and can generate color images to the user's eye 114. This example includes multiple adjacent (but potentially spaced apart) modules 1502 on the visual assembly 104. In this case, each module 1502 includes an LED light source that can produce IR and RGB light. Each module 1502 also includes a light detector that can detect IR and/or visible light. Each of these modules can be powered and/or controlled via one or more conductors (not specifically designated) in the visual assembly. Individual modules 1502 can be dynamically controlled to contribute to RGB images, eye tracking, or powered off, depending upon various parameters, such as eye gaze direction and/or foveation, among others. In some cases, the module may contribute to image generation for an entire cycle of image generation (e.g., frame). In other cases, the module may contribute to image generation for a sub-cycle of image duration and contribute to another function, such as eye tracking during another sub-cycle. Alternatively, the functionality may change if the user looks toward or away from the individual module.

The discussion above emphasizes emitting visible light or IR light, however, the LEDs 1402 can be controlled to selectively emit one or more of several IR wavelengths. This can allow different properties of each wavelength to be leveraged depending on the conditions and/or function. For instance, some wavelengths can provide better directional sensitivity than others to determine where the light is coming from. Further, different wavelengths can help with imaging the eye. For example, retinal images can be enhanced by using different wavelengths. Utilizing multiple IR wavelengths can facilitate distinguishing retinal reflections from corneal reflections. Conditions can also influence which IR wavelengths to utilize. For instance, some IR wavelengths are more affected by environmental factors. For example, 940 nm wavelength IR light is less affected by sunlight than lower wavelength IR light. Thus, 940 nm wavelength IR light could be employed outside in bright conditions and 830 nm wavelength IR light could be employed in lower light conditions, such as indoor environments.

Figure 16:
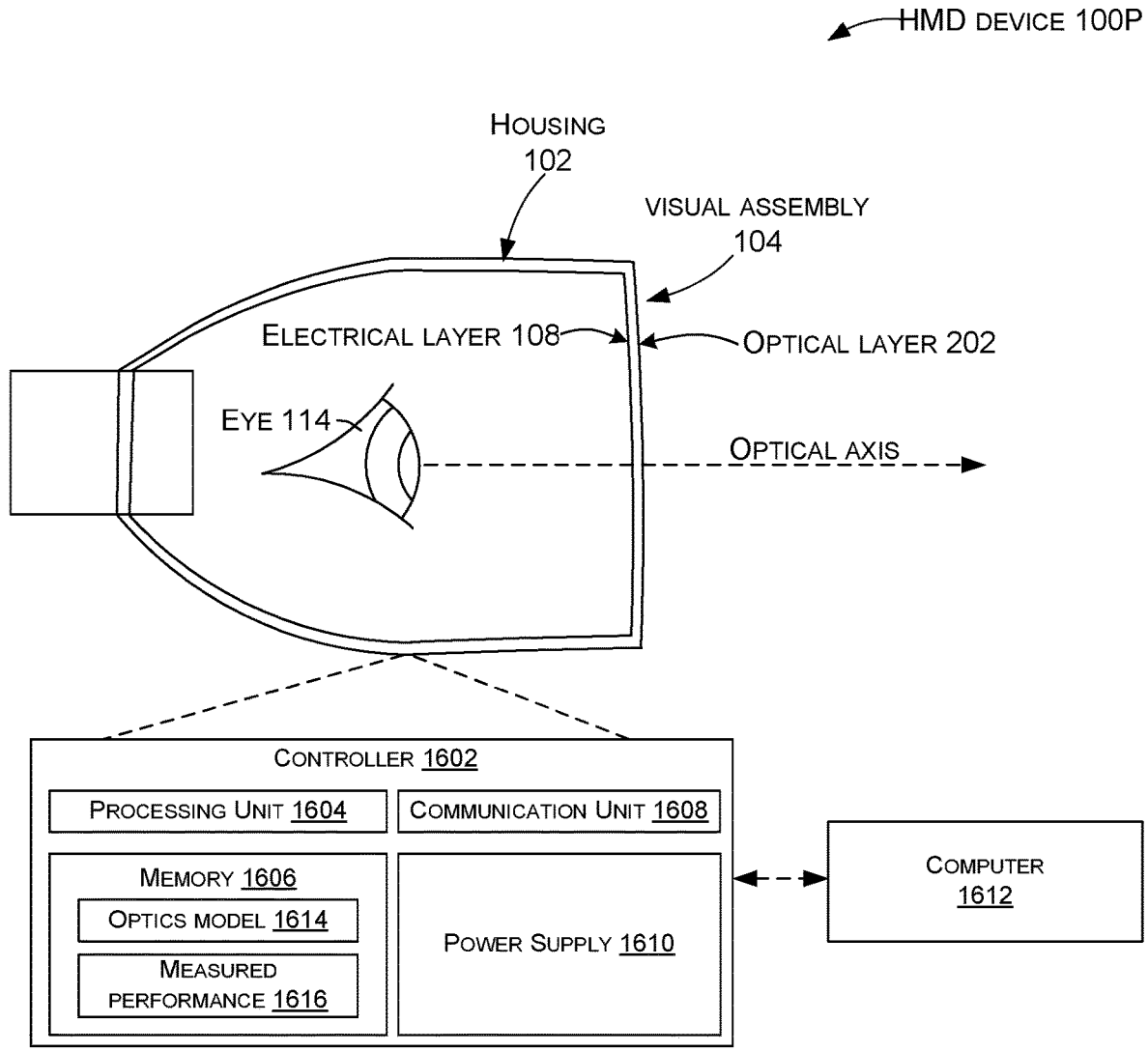

FIG. 16 shows a system 1600 that includes HMD device 100P that is similar to HMD device 100 described above relative to FIGS. 1A and 1B. As introduced above, the HMD device 100P can include housing (e.g., frame) 102 that positions the visual assembly 104 in line with the user's eye 114 along the optical axis. The electrical layer 108 and/or the optical layer 202 can include multiple microscopic (e.g., invisible to the user) components that are distributed across the visual assembly in the user's and/or the device's FoV including along the optical axis. The components can operate as modules that achieve specific functions, such as eye tracking, 3D sensing, and/or RGB image generation yet are imperceptible to the user.

The HMD device 100P can also include a controller 1602, a processing unit 1604, storage and/or memory 1606, a communication unit 1608, and/or a power supply 1610. In some implementations controller 1602 may include the processing unit 1604 and the memory 1606. The controller can utilize the memory for storing processor readable instructions and/or data, such as user data, image data, sensor data, etc. The communication unit 1608 can be communicatively coupled to the processing unit 1604 and can act as a network interface for connecting the HMD device to another computer system represented by computer 1612. The computer 1612 may include instances of any of the controller 1602, processing units 1604, memory 1606, communication units 1608, and power supplies 1610. The HMD device 100P may be robust and operate in a stand-alone manner and/or may communicate with the computer 1612, which may perform some of the described functionality.

Controller 1602 may provide commands and instructions, such as driving power to the electronic components 116 to generate visible and/or non-visible light. Similarly, the controller can receive data from sensors, such as IR sensors 702. The controller can use the data to identify information about the eye (e.g., eye tracking) and/or the environment (e.g., 3D mapping).

The controller 1602 can analyze the data from the sensors to identify features of the cornea and/or retina, such as by detecting glints of light and/or other detectable features associated with the user's eye, to determine the pupil position and gaze direction of the eye.

The storage/memory 1606 can include an optics model 1614 and/or measured performance (e.g., deviation data) 1616. The optics model 1614 can be derived from the design specifications of the HMD device and the distributed and dispersed arrangement of the various modules. Recall that the eye information from any individual eye tracking module or 3D mapping module may not be as robust as traditional designs positioned outside the FoV. The controller can analyze the eye information collectively to identify meaningful eye information.

The controller 1602 can use this eye information to control the modules. For instance, the controller may increase image resolution generated by RGB LEDs in foveated regions and decrease image resolution outside the foveated regions. Similarly, the controller can use eye movement to increase resolution in regions of the visual assembly the eyes are moving toward and decrease resolution in regions the eyes are moving away from.

In some implementations, the controller 1602 may also employ artificial intelligence algorithms, such as neural networks, for analyzing sensor data from the distributed sensors. The data from any one sensor may be rather rudimentary, yet the artificial intelligence algorithms can collectively analyze data from the available sensors to find meaningful patterns that are not apparent with traditional analytics.

Processing unit 1604 may include one or more processors including a central processing unit (CPU) and/or a graphics processing unit (GPU). Memory 1606 can be a computer-readable storage media that may store instructions for execution by processing unit 1604, to provide various functionality to HMD device 100P. Finally, power supply 1610 can provide power for the components of controller 1602 and the other components of HMD device 100P.

The term "device", "computer," "computing device," "client device," "server," and/or "server device" as used herein can mean any type of device that has some amount of hardware processing capability and/or hardware storage/memory capability. Processing capability can be provided by one or more hardware processing units 1604 and/or other processors (e.g., hardware processing units/cores) that can execute computer-readable instructions to provide functionality. Computer-readable instructions and/or data can be stored on persistent storage or volatile memory. The term "system" as used herein can refer to a single device, multiple devices, etc.

Memory 1606 can be storage resources that are internal or external to any respective devices with which it is associated. Memory 1606 can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others, which may constitute memory 1606.

In some cases, the HMD devices are configured with a general-purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), holographic processing units (HPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the code discussed herein can be implemented in software, hardware, and/or firmware. In any case, the code can be provided during manufacture of the device or by an intermediary that prepares the device for sale to the end user. In other instances, the end user may install these code later, such as by downloading executable code and installing the executable code on the corresponding device.

Also note that the components and/or devices described herein can function in a stand-alone or cooperative manner to implement the described techniques. For example, the methods described herein can be performed on a single computing device and/or distributed across multiple computing devices that communicate over one or more network(s). Without limitation, such one or more network(s) can include one or more local area networks (LANs), wide area networks (WANs), the Internet, and the like.

Example Methods

Figure 17:
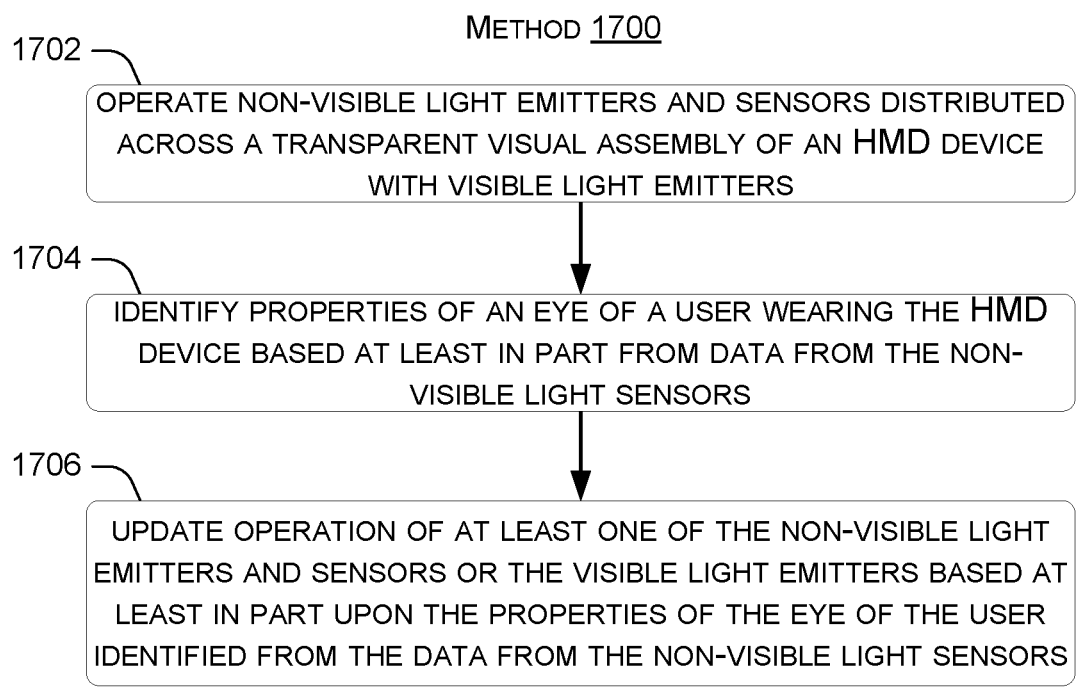
FIG. 17 illustrates example methods or techniques that are consistent with some implementations of the present concepts.

FIG. 17 illustrates an example method 1700, consistent with the present concepts. Method 1700 can be implemented by a single device, e.g., HMD device 100, or various steps can be distributed over one or more servers, client devices, etc. Moreover, method 1700 can be performed by one or more components, such as a controller and/or by other components and/or devices.

At block 1702, the method can operate non-visible light emitters and sensors distributed across a transparent visual assembly of an HMD device with visible light emitters.

At block 1704, the method can identify properties of an eye of a user wearing the HMD device based at least in part from data from the non-visible light sensors.

At block 1706, the method can update operation of at least one of the non-visible light emitters and sensors or the visible light emitters based at least in part upon the properties of the eye of the user identified from the data from the non-visible light sensors.

Various examples are described above. Another example relates to an eye tracking system where the illumination is placed on a see-through transparent substrate (e.g., combiner) and directed towards the users' eye.

Another example includes an eye tracking system where the illumination is placed on a see-through transparent substrate and pointed towards the real world. A reflector (e.g., IR selective reflector or partial mirror) collimates or partially collimates the LED illumination towards an eye box of an HMD device.

Another example taken alone or in combination with any of the above or below examples includes an eye tracking system where multiple LEDs are placed on a see-through transparent substrate and pointed towards the real world. A different type reflector is used for each LED so an entire eye box is illuminated by combining the illumination from multiple LEDs.

Another example taken alone or in combination with any of the above or below examples includes an eye tracking system where the IR light detector (camera or a single detector) is using a reflector embedded into the combiner to collimate and focus the beam on the detector.

Another example taken alone or in combination with any of the above or below examples includes an eye tracking system where both bright and dark images are imaged simultaneously.

Another example taken alone or in combination with any of the above or below examples includes an eye tracking system that uses multiple wavelengths.

Another example taken alone or in combination with any of the above or below examples includes an eye tracking system where multiple IR light detectors (camera or a single detector) are using different type reflectors embedded into the combiner to collect light from different parts of the eye box, and focus it on the detectors.

Another example taken alone or in combination with any of the above or below examples includes a system where the reflector is combined with other non-reflective optics.

Another example includes an eye tracking system where there is a plurality of LED (or display pixels) and detector (or camera pixel) arrays. Each LED or detector array faces an embedded reflector that collimates the outcoming or incoming light to or from the eye box. By combining multiple LEDs and detectors an improvement in resolution can be achieved.

Another example taken alone or in combination with any of the above or below examples includes an eye tracking system where there is a plurality of LED (or display pixels) and detector (or camera pixel) arrays. Each LED or detector array faces an embedded reflector that collimates the outcoming or incoming light to or from the eye box. By combining multiple LEDs and detectors an improvement in resolution can be achieved. Each LED or detector is activated at a different time so temporal resolution can be used to improve spatial resolution of the ET system.

Another example taken alone or in combination with any of the above or below examples includes an ET system where each LED source is composed of a number of sub-elements/pixels. By imaging these pixels on an ET camera and measuring the distortion of the IR pattern, more information can be obtained about the reflective surface (i.e., cornea).

Another example taken alone or in combination with any of the above or below examples includes a depth sensing system (such as Time of flight) where the "flood illumination" LEDs are attached on the combiner of the display and point directly towards the real world.

Another example taken alone or in combination with any of the above or below examples includes a depth sensing system (Time of flight or stereo) where the "flood illumination" LEDs are attached on the combiner of the display and point directly towards the user and then are reflected to the real world by an IR/partial mirror. This allows for the beam to have specific profile when illuminating the real world.

Another example taken alone or in combination with any of the above or below examples includes a depth sensing system (Time of flight or stereo) where an array of illumination LEDs are attached on the combiner of the display and point directly towards a reflector and then reflected to the real world by an IR/partial mirror. By switching different LEDs/pixels ON/OFF, it is possible to create a structured illumination that can enable or enhance depth sensing.

Another example taken alone or in combination with any of the above or below examples includes a depth sensing system where the camera is embedded into the combiner of the HMD device.

Another example taken alone or in combination with any of the above or below examples includes a depth sensing system where multiple cameras are embedded into the combiner of the HMD device. Each camera can cover part of the environment with different resolution or FoV.

Another example includes an HMD device that uses a plurality of mini-lenses to create the virtual image into the user's eye. Such a system can contain lenses that (a) form the image into the user's eye (b) enable ET by the use of emitters and sensors embedded into the mini lenses (c) facilitate or enhance depth sensing by providing lenses that emit light into the environment or sensors that collect light from the environment.

Another example includes a head mounted display device comprising a housing configured to be positioned relative to a head and eye of a user and a visual assembly positioned by the housing in front of the user's eye, the visual assembly comprising an electrical layer comprising side-by-side electronic components, individual electronic components configured to emit or detect light and an optical layer comprising side-by-side optical components, individual optical components configured to refract or reflect or diffract light relative to individual electronic components.

Another example can include any of the above and/or below examples where the electrical layer and the optical layer are formed on a single substrate or wherein the electrical layer comprises a first substrate and the optical layer comprises a second substrate, and wherein the first and second substrates are positioned against one another or wherein the first and second substrates are spaced apart from one another.

Another example can include any of the above and/or below examples where the optical layer is transparent.

Another example can include any of the above and/or below examples where at least some of the electronic components and optical components contribute to eye tracking of the eye of the user.

Another example can include any of the above and/or below examples where the electrical layer is positioned proximate to the user relative to the optical layer.

Another example can include any of the above and/or below examples where individual electronic components are paired with individual optical components as modules to achieve specific functionalities.

Another example can include any of the above and/or below examples where the specific functionalities include eye tracking illumination, eye tracking detection, image generation, 3D illumination, and/or 3D detection.

Another example can include any of the above and/or below examples where an individual eye tracking illumination pair comprises an individual electronic component that emits non-visible light away from the user's eye and an individual optical component that redirects the non-visible light back towards the user's eye.

Another example can include any of the above and/or below examples where an individual eye tracking detection pair further comprises a lens that receives the non-visible light reflected from the user's eye and focuses the non-visible light toward another individual electronic component that senses the non-visible light reflected back from the user's eye.

Another example can include any of the above and/or below examples where the another electronic component faces the user's eye or wherein the another electronic component is positioned behind the electronic component.

Another example can include any of the above and/or below examples where eye tracking illumination pairs and individual eye tracking detection pairs are distributed across the visual assembly.

Another example includes a head mounted display device comprising a housing configured to be positioned relative to a head and eye of a user and a transparent visual assembly positioned by the housing in front of the user's eye and comprising multiple eye tracking illuminators distributed across the transparent visual assembly and configured to emit non-visible light and multiple eye tracking detectors distributed across the transparent visual assembly and configured to detect the non-visible light reflected back from the eye of the user.

Another example can include any of the above and/or below examples where the eye tracking illuminators are configured to emit the non-visible light in a direction away from the eye of the user.

Another example can include any of the above and/or below examples where the transparent visual assembly further comprises optical components that include non-visible selective reflectors that are configured to collimate the non-visible light in an eye box defined by the head mounted display device.

Another example can include any of the above and/or below examples where the optical components are configured to operate cooperatively to illuminate an entire eye box for the user.

Another example can include any of the above and/or below examples where other optical components are distributed across the transparent visual assembly and configured to cooperatively generate a visual image in the eye box.

Another example can include any of the above and/or below examples where other optical components are configured to generate the visual image simultaneously to the optical components illuminating the entire eye box with the non-visible light.

Another example can include any of the above and/or below examples where the optical components, the other optical components, and the additional optical components are interspersed across a field of view of the transparent visual assembly.

Another example can include any of the above and/or below examples where the eye tracking illuminators are configured to emit the non-visible light in a direction toward the eye of the user.

Another example comprises a system that includes a visual assembly configured to be positioned in front of an eye of a user and comprising multiple eye tracking illuminators distributed across the visual assembly and configured to emit non-visible light and multiple eye tracking detectors distributed across the visual assembly and configured to detect the non-visible light reflected back from the eye of the user and a controller configured to process the detected non-visible light from multiple eye tracking detectors to identify information relating to the eye.

Another example can include any of the above and/or below examples where the controller is located on an HMD device that includes the visual assembly or wherein the controller is located on a computer that is configured to communicate with the HMD device.

CONCLUSION

Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims and other features and acts that would be recognized by one skilled in the art are intended to be within the scope of the claims.

The invention claimed is:

1. A head mounted display device, comprising:
a housing configured to be positioned relative to a head and eye of a user; and,
a visual assembly positioned by the housing in front of the user's eye, the visual assembly comprising:
an electrical layer positioned in front of the user's eye by the housing and comprising side-by-side electronic components, a first subset of the electronic components configured to emit visible light, a second subset of the electronic components configured to emit non-visible light, and a third subset of the electronic components configured to detect the non-visible light; and,
an optical layer positioned on an opposite side of the electrical layer from the user's eye and comprising side-by-side optical components positioned in front of the user's eye by the housing and that allow ambient light to pass therethrough, individual optical components configured to reflect the emitted visible light back through the electrical layer to collectively form an image with the ambient light for the user's eye and to reflect the emitted non-visible light back through the electrical layer toward the user's eye and to refract non-visible light returning from the user's eye through the electrical layer back toward the third subset of electronic components.

2. The head mounted display device of claim 1, wherein the electrical layer and the optical layer are formed on a single substrate or wherein the electrical layer comprises a first substrate and the optical layer comprises a second substrate, and wherein the first and second substrates are positioned against one another or wherein the first and second substrates are spaced apart from one another.

3. The head mounted display device of claim 2, wherein the optical layer comprises a hexagonal array that is transparent to visible light.

4. The head mounted display device of claim 1, wherein at least some of the electronic components and optical components contribute to eye tracking of the eye of the user.

5. The head mounted display device of claim 1, wherein the electrical layer is transparent to some wavelengths of light.

6. The head mounted display device of claim 1, wherein individual electronic components are paired with individual optical components as modules to achieve specific functionalities.

7. The head mounted display device of claim 6, wherein the specific functionalities include eye tracking illumination, eye tracking detection, image generation, 3D illumination, and/or 3D detection.

8. The head mounted display device of claim 7, wherein an individual eye tracking illumination pair comprises an individual electronic component that emits non-visible light away from the user's eye and an individual optical component that redirects the non-visible light back towards the user's eye.

9. The head mounted display device of claim 8, wherein an individual eye tracking detection pair further comprises a lens that receives the non-visible light reflected from the user's eye and focuses the non-visible light toward another individual electronic component that senses the non-visible light reflected back from the user's eye.

10. The head mounted display device of claim 9, wherein the another electronic component faces the user's eye or wherein the another electronic component is positioned behind the electronic component.

11. The head mounted display device of claim 10, wherein eye tracking illumination pairs and eye tracking detection pairs are distributed across the visual assembly.

12. A head mounted display device, comprising:
a housing configured to be positioned relative to a head and eye of a user; and,
a transparent visual assembly positioned by the housing in front of the user's eye and comprising:
multiple eye tracking illuminators positioned in the transparent visual assembly and distributed across the transparent visual assembly and configured to emit non-visible light in a direction away from the eye of the user;
multiple non-visible selective reflectors that are configured to collimate the non-visible light in an eye box defined by the head mounted display device;
multiple eye tracking detectors positioned in the transparent visual assembly and distributed across the transparent visual assembly and configured to detect the non-visible light reflected back from the eye of the user; and
multiple visible light emitters positioned in the transparent visual assembly and configured to emit visible light,
wherein the multiple eye tracking illuminators, the multiple non-visible selective reflectors, the multiple eye tracking detectors, and the multiple visible light emitters are positioned on the transparent visual assembly within a field of view of the user, and
wherein an image visible to the eye of the user is formed collectively by the visible light emitted by the multiple visible light emitters with ambient light that passes through the transparent visual assembly within the field of view of the user.

13. The head mounted display device of claim 12, wherein the multiple eye tracking illuminators and the multiple non-visible selective reflectors are configured to operate cooperatively to illuminate an entire eye box for the user.

14. The head mounted display device of claim 13, further comprising:
a controller configured to process the detected non-visible light from the multiple eye tracking detectors to identify information relating to the eye.

15. The head mounted display device of claim 14, wherein the controller is configured to use the information to control the multiple visible light emitters.

16. A system, comprising:
a transparent visual assembly configured to be positioned in front of an eye of a user and comprising:
multiple eye tracking illuminators positioned in the transparent visual assembly and distributed across the visual assembly and configured to emit non-visible light;
multiple selective reflectors positioned in the transparent visual assembly and configured to reflect the non-visible light toward the eye of the user;
multiple eye tracking detectors positioned in the transparent visual assembly and distributed across the visual assembly and configured to detect the non-visible light reflected back from the eye of the user; and,
multiple visible light emitters positioned in the transparent visual assembly and configured to emit visible light; and
a controller configured to process the detected non-visible light from the multiple eye tracking detectors to identify information relating to the eye,
wherein the multiple eye tracking illuminators, the multiple selective reflectors, the multiple eye tracking detectors, and the multiple visible light emitters are positioned on the transparent visual assembly within a field of view of the user, and
wherein an image visible to the eye of the user is formed collectively by the visible light emitted by the multiple visible light emitters with ambient light that passes through the transparent visual assembly within the field of view of the user.

17. The system of claim 16, provided on a head-mounted display.

18. The system of claim 17, wherein the controller is configured to adjust resolution of image content generated by the multiple visible light emitters based at least on the detected non-visible light from the multiple eye tracking detectors.

19. The system of claim 18, wherein the controller is configured to selectively activate individual eye-tracking illuminators at different times.

20. The system of claim 19, wherein selective activation of the individual eye-tracking illuminators results in increased spatial resolution as a function of temporal resolution provided by the selective activation.

* * * * *